(12) United States Patent
Lei et al.

(10) Patent No.: US 10,893,547 B2
(45) Date of Patent: Jan. 12, 2021

(54) CONFIGURATION OF A FIRST MESSAGE FOR A TWO-STEP RANDOM ACCESS CHANNEL PROCEDURE

(71) Applicant: QUALCOMM Incorporated, San Diego, CA (US)

(72) Inventors: Jing Lei, San Diego, CA (US); Hung Dinh Ly, San Diego, CA (US); Yi Huang, San Diego, CA (US); Peter Gaal, San Diego, CA (US); Joseph Binamira Soriaga, San Diego, CA (US); Amir Aminzadeh Gohari, Sunnyvale, CA (US); Wanshi Chen, San Diego, CA (US); Linhai He, San Diego, CA (US); Tingfang Ji, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/743,673

(22) Filed: Jan. 15, 2020

(65) Prior Publication Data
US 2020/0236716 A1 Jul. 23, 2020

Related U.S. Application Data

(60) Provisional application No. 62/795,510, filed on Jan. 22, 2019.

(51) Int. Cl.
*H04W 74/08* (2009.01)
*H04W 72/04* (2009.01)
*H04L 5/00* (2006.01)

(52) U.S. Cl.
CPC ....... *H04W 74/0833* (2013.01); *H04L 5/0048* (2013.01); *H04W 72/042* (2013.01)

(58) Field of Classification Search
None
See application file for complete search history.

(56) References Cited

U.S. PATENT DOCUMENTS

2010/0041428 A1* 2/2010 Chen .................... H04W 52/16
455/522
2016/0352477 A1* 12/2016 Nishio .................... H04L 5/005
(Continued)

OTHER PUBLICATIONS

"3rd Generation Partnership Project:Technical Specification Group Radio AccessNetwork; Evolved Universal Terrestrial Radio Access (E-UTRA); Medium AccessControl (MAC) protocol specification (Release 15)" 3GPP Draft, 36321-F40, 3rd Generation Partnership Project (3GPP), Mobile Competence Centre, 650, Route Des Lucioles, F-06921, Sophia-Antipolis Cedex, France, Jan. 13, 2019, XP051686906, 131 pages, Retrieved from the Internet: URL: http://www.3gpp.org/ftp/3guInternal/3GPP%5Fultimate%5Fversions%5Fto%5Fbe%5Ftransposed/sentToDpc/36321%2Df40%2Ezip [retrieved on Jan. 13, 2019]section 1 "Scope", section 5.1, "Random Access procedure".

(Continued)

*Primary Examiner* — Otis L Thompson, Jr.
(74) *Attorney, Agent, or Firm* — Procopio, Cory, Hargreaves LLP; Nerrie M. Zohn

(57) ABSTRACT

A user equipment (UE) may be configured to receive configuration information from a base station, and the configuration information may indicate at least two different random access channel (RACH) request configuration parameters that each is associated with a respective radio resource control (RRC) state. The UE may be further configured to generate a first message associated with a two-step RACH procedure including a preamble and a payload, the payload including data on an uplink data channel and at least one reference signal. The UE may be further configured to transmit the first message to the base (Continued)

station using at least one of the at least two different RACH request configuration parameters that corresponds to an RRC state of the UE. The preamble may be transmitted on a first set of resources associated with a RACH occasion, and the payload may be transmitted on a second set of resources.

30 Claims, 15 Drawing Sheets

(56) References Cited

U.S. PATENT DOCUMENTS

| | | | | |
|---|---|---|---|---|
| 2017/0251460 | A1* | 8/2017 | Agiwal | H04W 72/0406 |
| 2018/0132282 | A1 | 5/2018 | Ly et al. | |
| 2018/0139787 | A1* | 5/2018 | Islam | H04L 5/0053 |
| 2018/0205516 | A1* | 7/2018 | Jung | H04L 5/0051 |
| 2018/0279376 | A1* | 9/2018 | Dinan | H04W 74/0833 |
| 2019/0029049 | A1* | 1/2019 | Akkarakaran | H04W 72/085 |
| 2019/0132866 | A1* | 5/2019 | Goto | H04L 5/00 |
| 2019/0342912 | A1* | 11/2019 | Priyanto | H04W 74/006 |
| 2019/0349837 | A1* | 11/2019 | Shih | H04W 48/12 |
| 2019/0363843 | A1* | 11/2019 | Gordaychik | H04W 8/22 |
| 2019/0364599 | A1* | 11/2019 | Islam | H04W 74/004 |
| 2020/0077446 | A1* | 3/2020 | Agiwal | H04W 74/0833 |
| 2020/0100311 | A1* | 3/2020 | Cirik | H04W 76/19 |

OTHER PUBLICATIONS

Huawei, et al., "Two-step RACH Procedure for NR-U," 3GPP Draft, 3GPP TSG-RAN WG2 Meeting #103bis, R2-1814865, Two-step RACH Procedure for NR-U, 3rd Generation Partnership Project (3GPP), Mobile Competence Centre, 650, Route Des Lucioles, F-06921, Sophia-Antipolis Cedex, France, vol. RAN WG2, No. Chengdu, China; 20181008-20181012, Sep. 28, 2018 (Sep. 28, 2019), XP051524246, 4 pages, Retrieved from the Internet: URL: http://www.3gpp.org/ftp/tsg%5Fran/WG2%5FRL2/TSGR2%5F103bis/Docs/R2%2D1814865%2Ezip [retrieved on Sep. 28, 2018] the whole document.

International Search Report and Written Opinion—PCT/US2020/013875—ISA/EPO—dated Apr. 3, 2020.

Oppo: "2- Steps RACH Procedure for NR-U", 3GPP Draft, 3GPP TSG-RAN WG2 Meeting #104, R2-1816263, 2-steps RACH procedure for NR-U, 3rd Generation Partnership Project (3GPP), Mobile Competence Centre, 650, Route Des Lucioles, F-06921, Sophia-Antipolis Cedex, France, vol. RAN WG2, No. Spokane, USA, 20181112-20181116, Nov. 12, 2018 (Nov. 12, 2018), XP051555863, 4 pages.

Retrieved from the Internet: URL: http://www.3gpp.org/ftp/Meetings%5F3GPP%5FSYNC/RAN2/Docs/R2%2D1816263%2Ezip [retrieved on Nov. 12, 2018], the whole document.Continuation of Box 6.

Qualcomm Incorporated: "Report of Email Discussion [103#55] [NR-U] 2-step RACH Model and Initial Information Contents (Qualcomm)", 3GPP Draft, 3GPP TSG-RAN WG2 Meeting #103bis, R2-1815564 Report Email Discussion NRU 2Step, 3rd Generation Partnership Project (3GPP), Mobile Competence Centre, 650, Route Des Lucioles, F-06921, Sophia-Antipolis Cedex, France, vol. RAN WG2, No. Chengdu, China, Oct. 8, 2018-Oct. 12, 2018, XP051524883, 17 pgs, Retrieved from the Internet: URL:http://www.3gpp.org/ftp/tsg%5Fran/WG2%5FRL2/TSGR2%5F103bis/Docs/R2%2D1815564%2Ezip [retrieved on Oct. 12, 2018], section 1 "Introduction", section 2 "Discussion", Question 2, section 2 "Discussion", Question 9, Question 7 and subsequent answers;p. 12-p. 13.

* cited by examiner

CONFIGURATION OF A FIRST MESSAGE FOR A TWO-STEP RANDOM ACCESS CHANNEL PROCEDURE

CROSS REFERENCE TO RELATED APPLICATION(S)

This application claims the benefit of U.S. Provisional Application Ser. No. 62/795,510, entitled "CONFIGURATION OF A FIRST MESSAGE FOR A TWO-STEP RANDOM ACCESS CHANNEL PROCEDURE" and filed on Jan. 22, 2019, which is expressly incorporated by reference herein in its entirety.

BACKGROUND

Technical Field

The present disclosure relates generally to communications systems, and more particularly, to a user equipment and base station configured to perform a two-step random access channel procedure.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In many radio access networks (RANs), user equipment (UE) obtain information that facilitates communication with base stations during initial access, handover between base stations, connection reestablishment, and so forth. For example, a UE may acquire uplink timing synchronization with a base station and/or an uplink grant for a transmission to the base station from such information. This information may be determined by the base station and provided to the UE through a random access channel (RACH) procedure.

A RACH procedure typically involves the exchange of messages between a UE and a base station, such as three messages for a contention-free RACH procedure or four messages for a contention-based RACH procedure. The UE may refrain from including data in messages transmitted to the base station for such RACH procedures, e.g., because the UE has not yet acquired a timing advance.

Such contention-free and contention-based RACH procedures may incur overhead with respect to over-the-air signaling, timing, processing and power consumption, and so forth. The present disclosure, however, provides for a two-step RACH procedure, for example, for application in 5 G New Radio (NR) RANs. Such a two-step RACH procedure may address some overhead issues associated with four-step contention-based and/or three-step contention-free RACH procedures. For example, a UE without valid timing advance may initiate the two-step RACH procedure with a message that includes an uplink data channel. Furthermore, the two-step RACH procedure described in the present disclosure may be applicable to most or all cell types and sizes operated by base stations, as well as applicable to most or all radio resource control (RRC) states in which UEs may operate.

Commensurate with the fewer number of messages exchanged during RACH procedures, a greater amount of information may be included in and/or a greater amount of resources may be allocated for one of both of a first message (referred to as "msgA") transmitted by a UE to initiate a two-step RACH procedure and/or a second message (referred to as "msgB") transmitted by a base station to complete the two-step RACH procedure. Therefore, a need exists for techniques and approaches to configuring a UE and a base station for a two-step RACH procedure, as described in the present disclosure.

In one aspect of the disclosure, a method, a computer-readable medium, and an apparatus are provided. The apparatus may be a UE configured to receive configuration information from a base station, the configuration information indicating at least two different RACH request configuration parameters that each is associated with a respective radio resource control (RRC) state; generate a first message associated with a two-step RACH procedure including a preamble and a payload, the payload including data on an uplink data channel and at least one reference signal; and transmit the first message to the base station using at least one of the at least two different RACH request configuration parameters that corresponds to an RRC state of the UE, the preamble being transmitted on a first set of resources associated with a RACH occasion and the payload being transmitted on a second set of resources.

In one aspect, the uplink data channel includes a physical uplink shared channel (PUSCH), and the at least one reference signal includes a demodulation reference signal (DMRS). In one aspect, the configuration information is included in at least one of a system information block (SIB) or a RRC message from the base station.

In one aspect, the apparatus may be further configured to determine at least one power control scheme for transmission of the first message based on a modulation and coding scheme (MCS) and bandwidth configured for the payload, wherein the at least one power control scheme is indicated in the at least two different RACH request configuration parameters. In one aspect, the preamble and the payload are transmitted using different power control schemes indicated by the at least one of the at least two different RACH request configuration parameters.

In one aspect, the first message includes a time gap between the preamble and the payload, and the time gap includes a configurable number of slots or symbols between the preamble and the payload. In one aspect, the preamble indicates at least one of a size of the payload or a MCS configured for the payload. In one aspect, the configuration information indicates at least one configuration in a time domain, a frequency domain, or a spatial domain for the first set of resources associated with the RACH occasion.

In one aspect, the configuration information indicates at least one of: a physical RACH (PRACH) configuration index associated with at least one RACH occasion configuration in the time domain, a number of RACH occasions available for the RACH procedure associated with the at least one configuration in the frequency domain, a starting frequency resource associated with the RACH occasions, a number of preamble sequences per synchronization signal (SS)/physical broadcast channel (PBCH) block, or a number of SS/PBCH blocks associated with each of the RACH occasions. In one aspect, the RRC state of the UE is associated with at least one of a size of the payload or a MCS configured for the payload.

In one aspect, at least one of a sequence length associated with the preamble or a subcarrier spacing associated with the transmission of the first message is based on at least one of a type of a cell operated by the base station or the RRC state of the UE.

In one aspect, the preamble occupies a different bandwidth portion than the payload, the preamble is transmitted with a different target power or a different power ramping step size than the payload, the preamble is transmitted via a different beam pair than the payload, or the preamble is transmitted with a different subcarrier spacing than the payload.

In one aspect, the apparatus may be is further configured to receive a second message associated with the two-step RACH procedure from the base station in response to the first message, wherein the second message includes control information on a downlink control channel and data on a downlink data channel. In one aspect, the first message includes a msgA initiating the two-step RACH procedure and the second message includes a msgB enabling completion of the two-step RACH procedure.

In another aspect of the disclosure, another method, another computer-readable medium, and another apparatus are provided. The other apparatus may be a base station configured to transmit configuration information indicating at least two different RACH request configuration parameters that each is associated with a respective RRC state; receive a first message associated with the RACH procedure from a UE based on the configuration information, a preamble of the first message being received on a first set of resources associated with a RACH occasion and a payload of the first message being received on a second set of resources; and transmit a second message associated with the RACH procedure to the UE in response to the first message, the second message including control information on a downlink control channel and data on a downlink data channel.

In one aspect, the downlink control channel includes a physical downlink control channel (PDCCH) and the downlink data channel includes a physical downlink shared channel (PDSCH). In one aspect, the configuration information indicating the RACH request configuration parameters is transmitted in a RRC message to the UE or broadcast in a SIB. In one aspect, the first message includes a time gap between the preamble and the payload, and the time gap includes a configurable number of slots or symbols between the preamble and the payload.

In one aspect, the other apparatus may be further configured to determine at least one of a size of the payload or a MCS configured for the payload based on the preamble of the first message. In one aspect, the configuration information indicates at least one configuration in a time domain, a frequency domain, or a spatial domain for the first set of resources associated with the RACH occasion.

In one aspect, the configuration information indicates at least one of: a configuration index associated with the configuration in the time domain, a number of RACH occasions available for the RACH procedure associated with the configuration in the frequency domain, a starting frequency resource associated with the RACH occasions, a number of preamble sequences per SS/PBCH block, or a number of SS/PBCH blocks associated with each of the RACH occasions. In one aspect, at least one of a size of the payload or a MCS configured for the payload is based on an RRC state of the UE.

In one aspect, at least one of a sequence length associated with the preamble or a subcarrier spacing associated with the receiving the first message is based on at least one of a type of a cell operated by the base station or an RRC state of the UE. In one aspect, the preamble occupies a different bandwidth portion than the payload, the preamble is transmitted with a different target power or a different power ramping step size than the payload, the preamble is received via a different beam pair than the payload, or the preamble is received with a different subcarrier spacing than the payload. In one aspect, the RACH procedure includes a two-step RACH procedure, and wherein the first message includes a msgA initiating the two-step RACH procedure and the second message includes a msgB enabling completion of the two-step RACH procedure.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
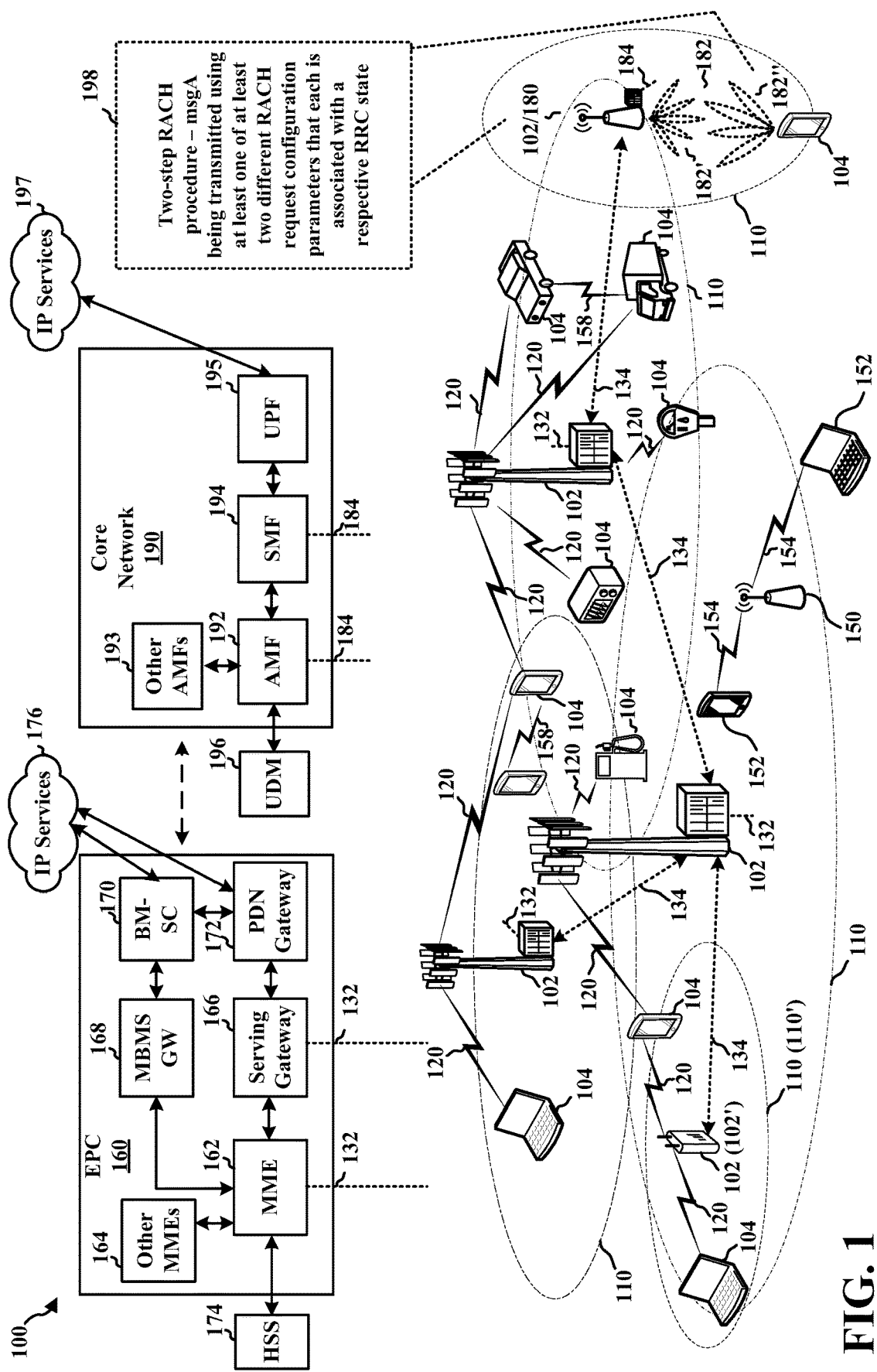
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunications systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example aspects, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G Long Term Evolution (LTE) (collectively referred to as Evolved Universal Mobile Telecommunications System (UMTS) Terrestrial Radio Access Network (E-UTRAN)) may interface with the EPC 160 through backhaul links 132 (e.g., S1 interface). The base stations 102 configured for 5G New Radio (NR) (collectively referred to as Next Generation RAN (NG-RAN)) may interface with core network 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band (e.g., 3 GHz-300 GHz) has extremely high path loss and a short range. The mmW base station 180 may utilize beamforming 182 with the UE 104 to compensate for the extremely high path loss and short range.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Although the present disclosure may focus on 5G NR, the concepts and various aspects described herein may be applicable to other similar areas, such as LTE, LTE-Advanced (LTE-A), Code Division Multiple Access (CDMA), Global System for Mobile communications (GSM), or other wireless/radio access technologies.

Referring again to FIG. 1, in certain aspects, the base station 102/180 may transmit configuration information associated with a random access channel (RACH) procedure, which may be received by the UE 104 in the coverage area 110 of the base station 102/180. The configuration information may indicate information associated with a two-step RACH procedure, such as at least two different RACH request configuration parameters with which the UE 104 may be configured. For example, the configuration information may indicate at least two different preamble groups, at least two different payload sizes, at least two different MCSs, at least two different time and frequency resource allocations, and/or or at least two different power control schemes. Each of the at least two different RACH request configuration parameters may correspond to a respective radio resource control (RRC) state, such as RRC Idle, RRC Inactive, or RRC Connected.

After reception of the configuration information, the UE 104 may generate a first message associated with the two-step RACH procedure. The first message may include a preamble and a payload, which may further include data on an uplink data channel and at least one reference signal. The UE 104 may transmit the first message (also referred to as a "msgA") to the base station 102/180 using at least one of the at least two different RACH request configuration parameters (configured by the base station 102/180) that corresponds to an RRC state of the UE 104 in order to initiate the two-step RACH procedure (198). In some aspects, the UE 104 may be configured to transmit the preamble and the payload with different ones of the at least two power control schemes.

The base station 102/180 may receive the first message and, in response to the first message, may generate a second message (also referred to as a "msgB"). The second message may include control information on a downlink control channel and data on a downlink data channel. The base station 102/180 may transmit the second message to the UE 104 in order to complete the two-step RACH procedure (198).

The present disclosure may describe some additional aspects associated with the two-step RACH procedure (198).

Figure 2:
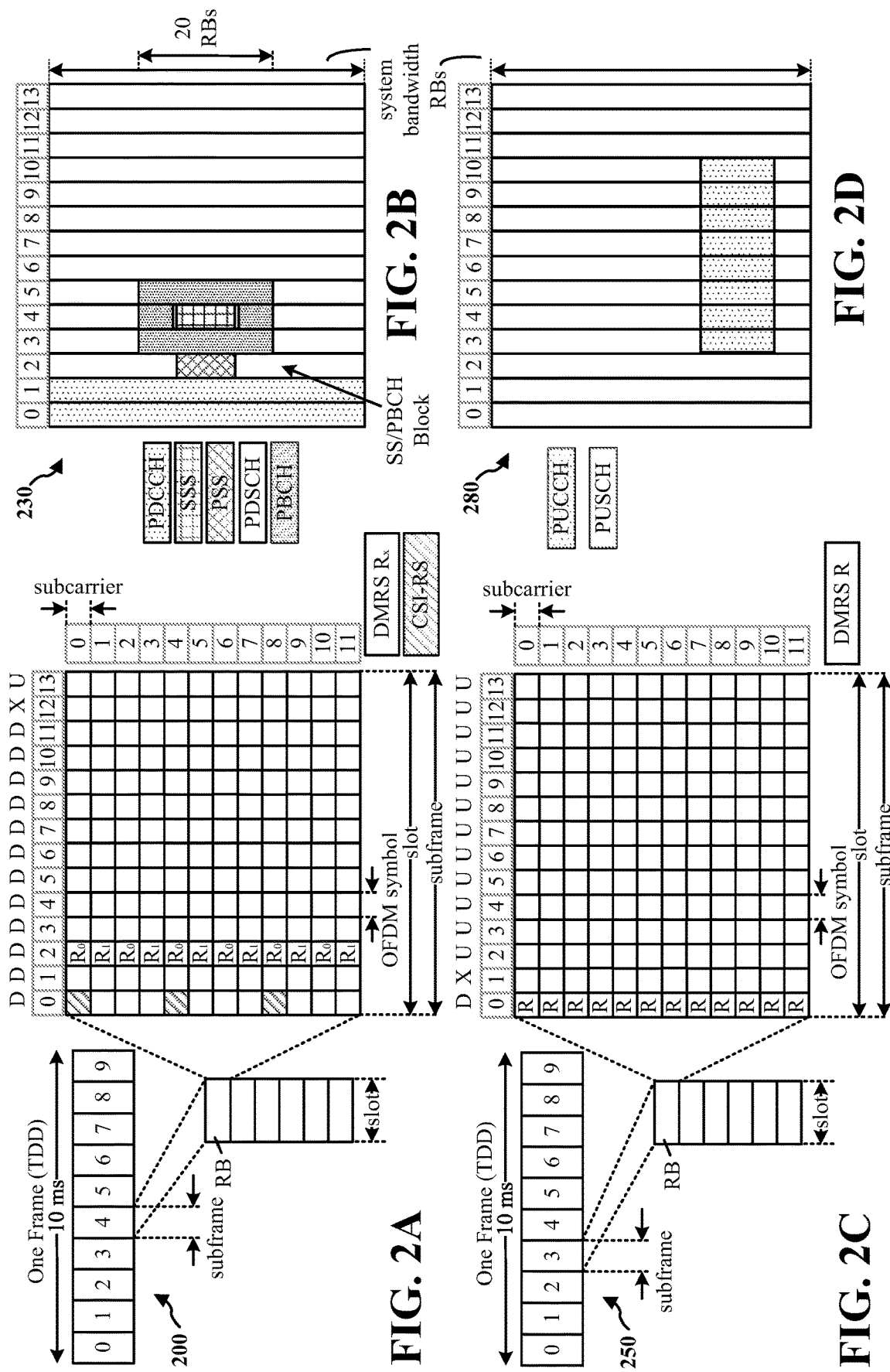
FIGS. 2A, 2B, 2C, and 2D are diagrams illustrating examples of a first 5G/NR frame, DL channels within a 5G/NR subframe, a second 5G/NR frame, and UL channels within a 5G/NR subframe, respectively.

FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through RRC signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^\mu$ slots/subframe. The subcarrier spacing (SCS) and symbol length/duration are a function of the numerology. The SCS may be equal to $2^\mu *15$ kHz, where $\mu$ is the numerology 0 to 5. As such, the numerology $\mu=0$ has a SCS of 15 kHz and the numerology $\mu=5$ has a SCS of 480 kHz. The symbol length/duration is inversely related to the SCS. FIGS. 2A-2D provide an example of slot configuration 0 with 14 symbols per slot and numerology $\mu=0$ with 1 slot per subframe. The SCS is 15 kHz and symbol duration is approximately 66.7 μs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DMRS) (indicated as $R_x$ for one particular configuration, where 100× is the port number, but other DMRS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DMRS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DMRS (indicated as R for one particular configuration, but other DMRS configurations are possible) for channel estimation at the base station. The UE may transmit DMRS for the physical uplink control channel (PUCCH) and DMRS for the physical uplink shared channel (PUSCH). The PUSCH DMRS may be transmitted in the first one or two symbols of the PUSCH. The PUCCH DMRS may be transmitted in different configurations depending on whether short or long PUCCHs are transmitted and depending on the particular PUCCH format used. Although not shown, the UE may transmit sounding reference signals (SRS). The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (B SR), a power headroom report (PHR), and/or UCI.

Figure 3:
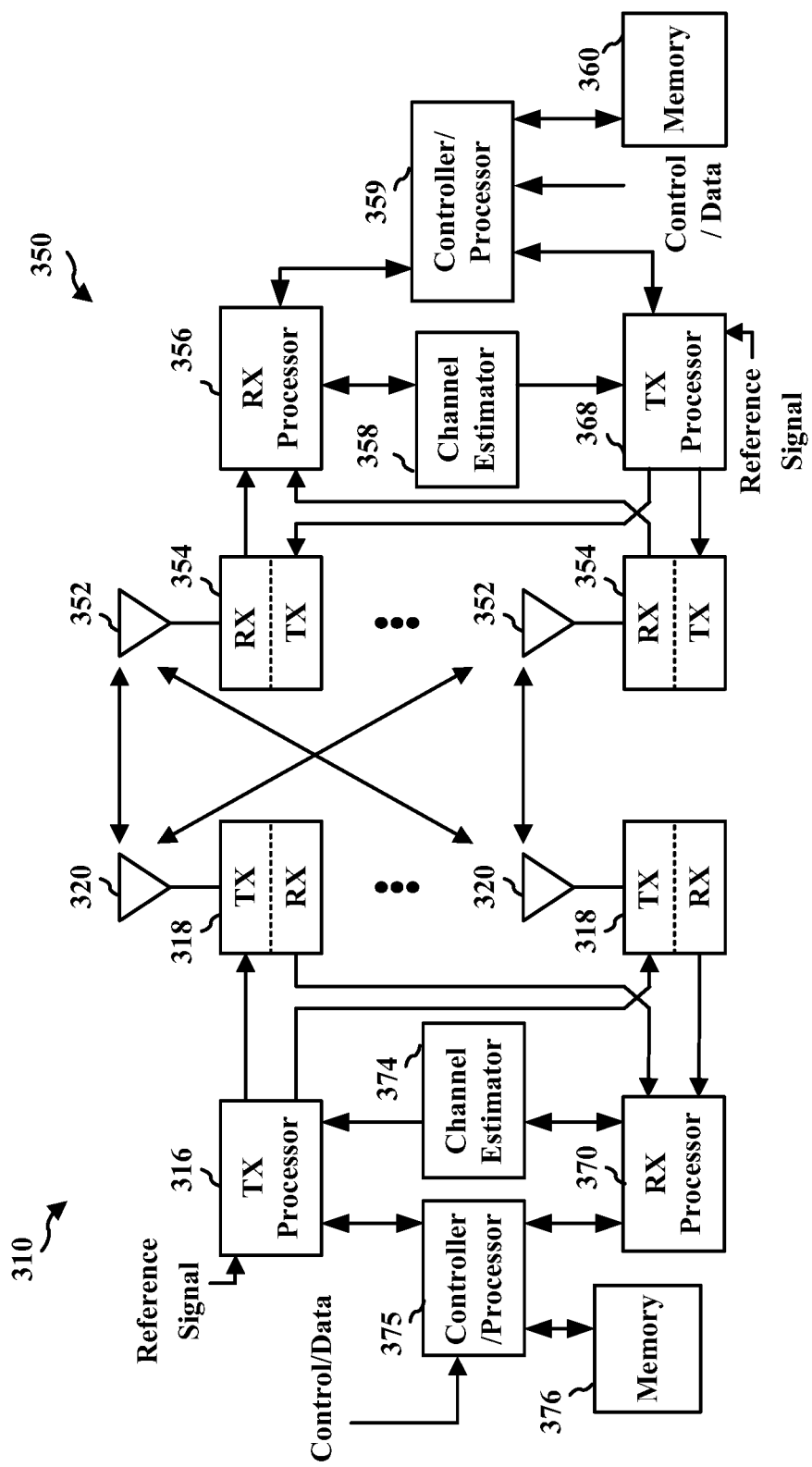
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a RRC layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

In some aspects associated with a UE, at least one of the TX processor 368, the RX processor 356, and the controller/processor 359 may be configured to perform aspects in connection with (198) of FIG. 1. In some other aspects associated with a base station, at least one of the TX processor 316, the RX processor 370, and the controller/processor 375 may be configured to perform aspects in connection with (198) of FIG. 1.

With reference to FIGS. 4-15, various techniques and approaches associated with RACH procedures are provided. A RACH procedure may provide a UE with information that facilitates communication with base stations during initial access, handover between base stations, connection reestablishment, and so forth. For example, a UE may acquire uplink timing synchronization with a base station and/or an uplink grant for a transmission to the base station based on information obtained via the RACH procedure.

For some existing RATs, RACH procedures are either contention-free or contention-based. A contention-free RACH procedure typically involves the exchange of three messages between a UE and a base station, e.g., when the UE is operating in an RRC Connected state, such as when the UE is handed over to the base station. An example message flow of the contention-free RACH procedure may include assignment of a preamble by the base station to the UE, transmission of the assigned preamble by the UE to the base station, and transmission of a random access response by the base station to the UE. The random access response may include a timing advance and/or an uplink grant, based upon which the UE may transmit uplink data to the base station.

A contention-based RACH procedure typically involves the exchange of four messages between a UE and a base station, e.g., when the UE is initialing accessing a RAN or reestablishing a connection with the RAN. An example message flow of the contention-based RACH procedure may include transmission of a preamble by the UE to the base station, transmission of a random access response by the base station to the UE, transmission of a connection request message by the UE to the base station, and transmission of a contention resolution message by the base station to the UE. While the random access response may include a timing advance and/or an uplink grant for the UE, the latter two messages may still be needed for contention resolution between conflicting UEs.

Such contention-free and contention-based RACH procedures may incur overhead with respect to over-the-air signaling, timing, processing and power consumption, and so forth. For example, a UE may be unable to include data in messages transmitted to the base station for the aforementioned contention-free and contention-based RACH procedures, e.g., because the UE has acquired neither a timing advance nor an uplink grant and, if applicable, contention at a base station associated with conflicting UEs is unresolved until completion of the RACH procedure.

FIGS. 4-15 describe a two-step RACH procedure, as well as additional aspects related to the two-step RACH procedure. In relation to a four-step RACH procedure, for example, both the first and third messages (that is, the preamble and connection request messages, respectively) transmitted by the UE may be combined into a single message, and both the second and fourth messages (that is, the random access response and contention resolution messages, respectively) transmitted by the base station may be combined into a single message. The two-step RACH procedure may be applicable in 5G NR RANs and/or other mmW and/or near-mmW RANs.

The two-step RACH procedure may address some overhead issues associated with four-step contention-based and/or three-step contention-free RACH procedures. For example, a UE without valid timing advance may initiate the two-step RACH procedure with a message that includes an uplink data channel. Furthermore, the two-step RACH procedure described in the present disclosure may be applicable to most or all cell types and sizes operated by base stations, as well as applicable to most or all RRC states in which UEs may operate.

As the message flow and structure of the two-step RACH procedure is different from that of three- and four-step RACH procedures, the present disclosure may provide for techniques and solutions to configuring the UE for the two-step RACH procedure. Furthermore, the present disclosure may provide for some approaches to the two-step RACH procedure that may mitigate the overhead commensurate with three- and/or four-step RACH procedures, such as through reduced latency, reduced over-the-air signaling, power and/or processing consumption, and so forth.

Figure 4:
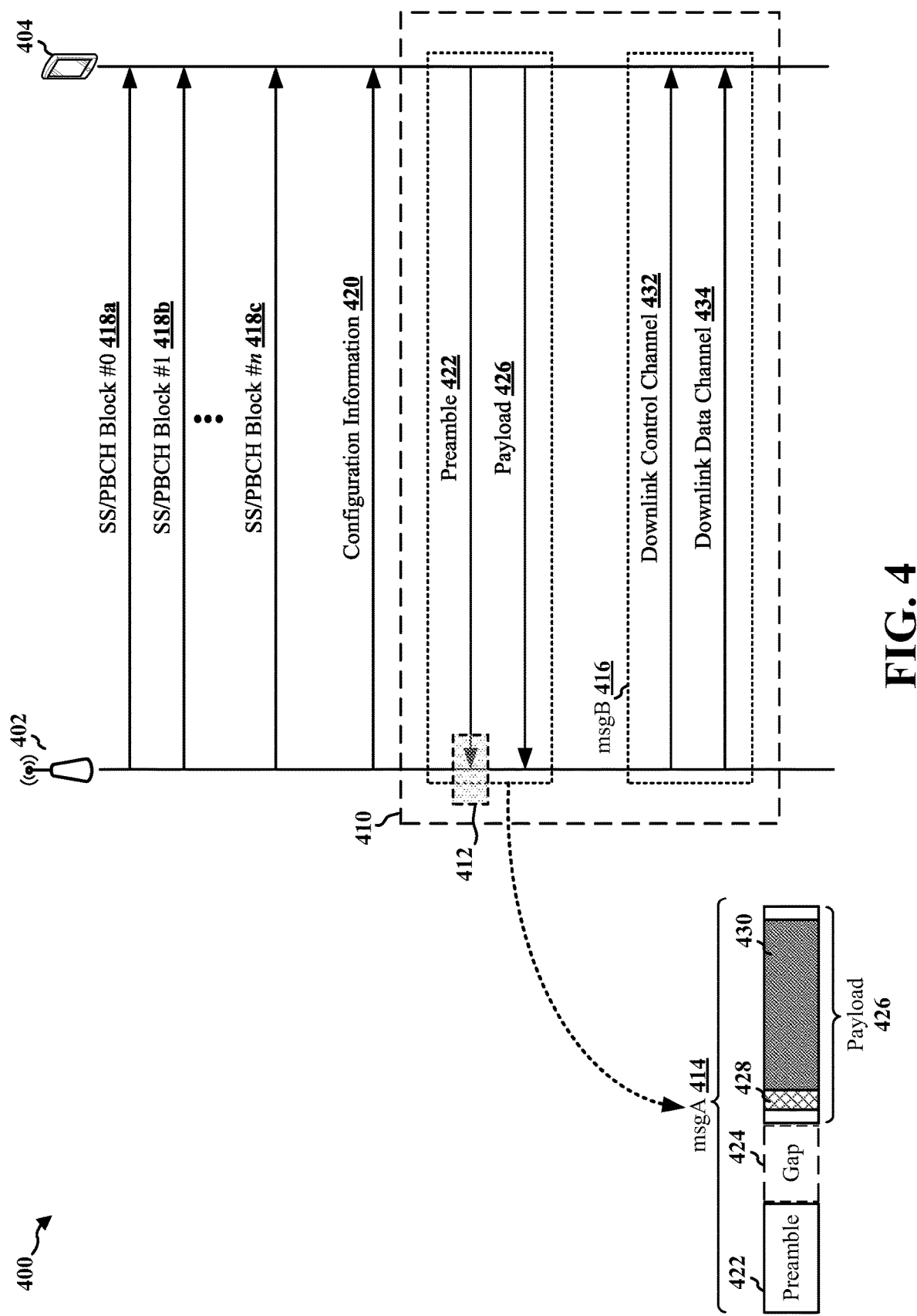
FIG. 4 is a call flow diagram of wireless communications system.

With reference to FIG. 4, a call flow diagram illustrates a RACH procedure 410 in a wireless communications system 400. The wireless communications system 400 may include a base station 402 and a UE 404. The base station 402 may provide a cell, on which the UE 404 may operate. Some example implementations of the base station 402 may be described with respect to the base station 102/180 of FIG. 1 and/or the base station 310 of FIG. 3. Some example implementations of the UE 404 may be described with respect to the UE 104 of FIG. 1 and/or the UE 350 of FIG. 3.

In order to communicate in the wireless communications system 400, the UE 404 may initially access the base station 402 and acquire a timing advance for transmission of uplink signals to the base station 402. If unconnected with the RAN of the base station 402, the UE 404 may perform a two-step RACH procedure 410, and furthermore, the base station 402 and the UE 404 may establish timing synchronization (e.g., uplink timing synchronization) through the RACH procedure 410. For example, the UE 404 may initiate the two-step RACH procedure 410 for initial access in the cell provided by the base station 402, RRC connection reestablishment, handover from another base station to the base station 402, reacquisition of timing synchronization, transition from an RRC Inactive state, SCell timing alignment, request for Other System Information (OSI), and/or beam failure recovery.

In the wireless communications system 400, the two-step RACH procedure 410 may include the exchange of two messages. Specifically, the UE 404 may initiate the message exchange of the two-step RACH procedure 410 by sending a first RACH message 414 to the base station 402 and, responsive to the first RACH message 414, the base station may complete the message exchange of the RACH procedure 410 by sending a second RACH message 516 (also known as a RACH response message) to the UE 404. The first RACH message 414 may be referred to as "msgA" and the second RACH message 416 may be referred to as "msgB."

The two-step RACH procedure 410 may be applicable to any size of the cell provided by the base station 402, all RRC states in which the UE 404 may operate, and/or whether or not the UE 404 has a valid timing advance (TA) (e.g., a TA to provide for adjustment of the timing of uplink transmissions by the UE 404). The two-step RACH procedure 410 may differ in some aspects from other RACH procedures, such as RACH procedures in which four messages are exchanged (e.g., the contention-based RACH procedure, described supra). However, some aspects may be common across the two-step RACH procedure 410 and another RACH procedure (e.g., the four-step RACH procedure). For example, sequences associated with physical RACH (PRACH) and sequences associated with DMRS used for a four-step RACH procedure may also be used for the two-step RACH procedure 410. Further, a TX chain used for an uplink data channel (e.g., PUSCH) in a four-step RACH procedure may also be used for the two-step RACH procedure 410.

According to some aspects, the base station 402 may transmit each of a set of SS/PBCH blocks 418a-c via a respective one of a set of beams. Thus, each of the SS/PBCH blocks 418a-c may correspond to one of the beams of the base station 402. The UE 404 may receive one or more of the set of SS/PBCH blocks 418a-c, and may acquire downlink timing synchronization based on the received SS/PBCH blocks 418a-c (e.g., as described with respect to FIG. 2B, supra).

Further, the base station 402 may transmit configuration information 420 associated with operating on the cell provided by the base station 402. The configuration information 420 may be included in one message or may be separated across two or more messages. In one aspect, the base station 402 may periodically transmit (e.g., broadcast) the configuration information 420, such as in a MIB and/or one or more SIBs (e.g., as described with respect to FIG. 2B, supra). In another aspect, the base station 402 may transmit the configuration information 420 to the UE via RRC signaling.

The configuration information 420 may include information associated with the two-step RACH procedure 410. The configuration information 420 may include at least two different RACH request configuration parameters that each is associated with a respective RRC state in which the UE 404 may operate. The UE 404 may receive and decode one or more messages (e.g., a SIB, an RRC message, etc.) carrying the configuration information 420 and may perform the RACH procedure 410 based on the configuration information 420. For example, the UE 404 may determine at least one of the at least two different RACH request configuration parameters the corresponds to the RRC state of the UE 404, and the UE 404 may perform the RACH procedure 410 using the determined at least one of the at least two different RACH request configuration parameters.

In some aspects, the configuration information 420 may indicate at least one configuration associated with the two-step RACH procedure 410 in the time domain, the frequency domain, or the spatial domain. For example, the configuration information 420 may indicate at least one of a PRACH configuration index associated with the two-step RACH procedure 410 in the time domain, a number of RACH occasions available for the two-step RACH procedure 410 in the frequency domain, a starting frequency resource associated with the RACH occasions available for the two-step RACH procedure 410, a number of preamble sequences per SS/PBCH block, and/or a number of SS/PBCH blocks associated with each of the RACH occasions available for the two-step RACH procedure 410.

In some further aspects, the configuration information 420 may indicate information associated with resource allocation(s) for the msgA 414, sequence configurations associated with a preamble 422 of the msgA 414, modulation and coding schemes (MCSs) associated with the msgA 414, power control schemes associated with the msgA 414 (e.g., at least two power control schemes associated with the msgA 414), a time period associated with a gap included in the msgA 414 (e.g., the gap 424, described infra), and/or other configuration information.

To initiate the RACH procedure 410, the UE 404 may generate the msgA 414. For the RACH procedure 410, the UE 404 may generate the msgA 414 to include at least a PRACH preamble 422 and a payload 426. The payload 426 may include at least one reference signal 428 and data on an uplink data channel 430. For example, the at least one reference signal 428 may include a DMRS, and the uplink data channel 430 may be a PUSCH.

According to some configurations, the msgA 414 may include a gap 424 in time between the preamble 422 and the payload 426. For example, the gap 424 may be defined as a number of symbols and/or slots inserted between the preamble 422 and the payload 426. The time period of the gap 424 may be configured at the UE 404 by the base station 402. For example, the configuration information 420 may indicate the time period of the gap 424, such as by indicating a number of symbols and/or slots that occur between the preamble 422 and the payload 426.

With reference to the PRACH preamble 422, the UE 404 may determine a configuration for the preamble 422 (e.g., at least one preamble sequence, the preamble SCS, etc.) at least in part based on the configuration information 420 and/or at least in part based on one or more of a size of the payload 426, an MCS configured for the payload 426, a type of the cell operated by the base station 402, and/or an RRC state of the UE 404. In some aspects, the UE 404 may generate the preamble 422 based on at least one sequence. The at least one sequence upon which the preamble 422 is based may be described with respect to the length as either a long sequence or a short sequence.

The payload size of the msgA 414 may be indicated by the preamble 422 of the msgA 414. For example, for a specific RRC state, the preamble sequences configured on a RACH occasion may be divided into two groups: group A and group B. Preamble sequences belonging to group A and B may denote different payload sizes. In some aspects, the minimum payload size for RRC IDLE state may be 7 bytes, and the minimum payload size for RRC INACTIVE state may be 9 bytes. Larger payload size may be configured by the network, and an upper bound for the payload size may be unspecified.

The UE 404 may determine to use at least one of a long sequence or a short sequence for the preamble 422 based on one or more characteristics of the UE 404 and/or of the base station 402, such as a bandwidth configured for transmission of the preamble 422, the numerology of the preamble 422, the size of the cell provided by the base station 402 (e.g., small cell or macro cell), the RRC state of the UE 404, and/or other characteristic(s). Additionally or alternatively, the UE 404 may determine the SCS associated with the preamble 422 based on at least one of the type of cell operated by the base station 402 and/or the RRC state of the UE 404.

Illustratively, Table 1 shows PRACH preamble characteristics for a long sequence, which may have a length that is a multiple of 800 microseconds (μs), excluding the CP. A long sequence may have a numerology that is different from that of the uplink data channel 430 in the payload 426, and may occupy a bandwidth of 1.08/4.32 MHz. Table 2 shows PRACH preamble characteristics for a short sequence having a numerology that is the same as that of the uplink data channel 430 in the payload 426, and occupying a bandwidth of twelve PRBs, e.g., for a frequency range (FR) 1 with 15 kHz/30 kHz SCS and occupying a bandwidth of 2.16/4.32 MHz.

TABLE 1

| Format | Numerology (kHz) | Number of Repetitions | CP length (μs) | Preamble length (not including CP) (μs) |
|---|---|---|---|---|
| 0 | 1.25 | 1 | ≈100 | 800 |
| 1 | 1.25 | 2 | ≈680 | 1600 |
| 2 | 1.25 | 4 | ≈15 | 3200 |
| 3 | 5 | 1 | ≈100 | 800 |

TABLE 2

| Format | Number of Repetitions | CP length (μs) | Preamble length (not including CP) (μs) |
|---|---|---|---|
| A1 | 2 | 9.4 | 133 |
| A2 | 4 | 18.7 | 267 |
| A3 | 6 | 28.1 | 400 |
| B1 | 2 | 7.0 | 133 |
| B2 | 4 | 11.7 | 267 |
| B3 | 6 | 126.4 | 400 |
| B4 | 12 | 30.5 | 800 |
| C0 | 1 | 40.4 | 66.7 |
| C2 | 4 | 66.7 | 267 |

Referring to the payload 426, the UE 404 may generate the payload 426 to include at least one reference signal 428 (e.g., a DMRS) and data on an uplink data channel 430 (e.g., a PUSCH). The at least one reference signal 428 may be associated with the uplink data channel 430—e.g., the at least one reference signal 428 may be used by a receiver (e.g., the base station 402) for channel estimation when receiving the uplink data channel 430. In some aspects, the size of the payload 426 may be associated with the RRC state of the UE 404.

For the payload 426, the UE 404 may determine at least one of a TB size (e.g., TB size may be 7 bytes, 9 bytes, 40 bytes, or 125 bytes) and/or an MCS (e.g., the MCS may correspond to an index between 0 to 15, with 0 to 9 having a modulation order of 2 and 10 to 15 having a modulation order of 4). Illustratively, the UE 404 may determine the TB size to be one of 7 bytes, 9 bytes, 40 bytes, or 125 bytes. Further, the UE 404 may determine the MCS according to an MCS index, modulation order, target code rate, and/or spectral efficiency. For example, the UE 404 may determine the MCS according to one of Table 3 or Table 4, infra.

TABLE 3

| MCS Index $I_{MCS}$ | Modulation Order $Q_m$ | Target Code Rate $R \times [1024]$ | Spectral Efficiency |
|---|---|---|---|
| 0 | 2 | 120 | 0.2344 |
| 1 | 2 | 157 | 0.3066 |
| 2 | 2 | 193 | 0.3770 |
| 3 | 2 | 251 | 0.4902 |
| 4 | 2 | 308 | 0.6016 |
| 5 | 2 | 379 | 0.7402 |
| 6 | 2 | 449 | 0.8770 |
| 7 | 2 | 526 | 1.0273 |
| 8 | 2 | 602 | 1.1758 |
| 9 | 2 | 679 | 1.3262 |
| 10 | 4 | 340 | 1.3281 |
| 11 | 4 | 378 | 1.4766 |
| 12 | 4 | 434 | 1.6953 |
| 13 | 4 | 490 | 1.9141 |
| 14 | 4 | 553 | 2.1602 |
| 15 | 4 | 616 | 2.4063 |

TABLE 4

| MCS Index $I_{MCS}$ | Modulation Order $Q_m$ | Target Code Rate R × [1024] | Spectral Efficiency |
|---|---|---|---|
| 0 | 2 | 30 | 0.0586 |
| 1 | 2 | 40 | 0.0781 |
| 2 | 2 | 50 | 0.0977 |
| 3 | 2 | 64 | 0.1250 |
| 4 | 2 | 78 | 0.1523 |
| 5 | 2 | 99 | 0.1934 |
| 6 | 2 | 120 | 0.2344 |
| 7 | 2 | 157 | 0.3066 |
| 8 | 2 | 193 | 0.3770 |
| 9 | 2 | 251 | 0.4902 |
| 10 | 2 | 308 | 0.6016 |
| 11 | 2 | 379 | 0.7402 |
| 12 | 2 | 449 | 0.8770 |
| 13 | 2 | 526 | 1.0273 |
| 14 | 2 | 602 | 1.1758 |
| 15 | 4 | 340 | 1.3281 |

In one aspect, the UE 404 may perform one or more downlink measurements (e.g., to measure channel quality, such as reference signal received power (RSRP)) and may determine a state of a buffer of the UE 404 (e.g., buffer occupancy status) and the QoS of buffered data. Based on the one or more downlink measurements and/or based on the buffer state, the UE 404 may determine the TB size and/or the MCS to be applied to the payload 426. For example, the UE 404 may adjust the TB size and/or the MCS according to the current channel conditions (indicated by the downlink measurement(s)) and/or according to the amount of uplink data the UE 404 is to send to the base station 402 in the uplink data channel 430.

In another aspect, the UE 404 may determine the TB size and/or the MCS to be applied to the payload 426 based on the RRC state of the UE 404 and/or the size of the cell provided by the base station 402 on which the UE 404 operates. For example, the UE 404 may access a table (e.g., a lookup table) that indicates correspondence between each of a set of RRC states and/or cell sizes and a respective MCS and/or TB size to be applied for transmission of the payload 426. In various aspects, the table may be predefined in the UE 404 (e.g., stored according to a 3GPP standard) or may be signaled to the UE 404 from the base station 402 (e.g., in at least one SIB). Accordingly, the UE 404 may determine the current RRC state of the UE 404 and/or cell size provided by the base station 402, and then the UE 404 may refer to the table to determine the MCS and/or TB size that corresponds to the current RRC state and/or cell size. The UE 404 may then apply the determined MCS and/or TB size to the payload 426. With this variability, the UE 404 and base station 402 may benefit from a mechanism for indicating MCS, TB size, and/or payload size to the base station 402 by the UE 404.

With the preamble 422 sent separately from the payload 426, the preamble 422 may be used to indicate information about the payload 426 (e.g., the at least one reference signal 428 may provide channel estimation for the uplink data channel 430, thus the preamble 422 may be used to convey information other than channel estimation). For example, the UE 404 may generate the preamble 422 and/or assign the preamble 422 to a first set of resources in order to indicate the size of the payload 426, the MCS applied to the payload 426, and/or the TB size used for the payload 426.

In one aspect, the UE 404 may generate the preamble 422 according to a sequence configuration that indicates the size of the payload 426, the TB size in the payload 426, and/or the MCS applied to the payload 426. The UE 404 may determine the size of the payload 426, TB size in the payload 426, and/or MCS, and the UE 404 may determine a sequence configuration that corresponds to the size of the payload 426, TB size, and/or the MCS. For example, the UE 404 may access a table (e.g., a lookup table) that indicates correspondence between a respective sequence configuration and a respective size of the payload 426, TB size, and/or MCS. The UE 404 may receive information (e.g., table) indicating a respective size of the payload 426, TB size, and/or MCS and a corresponding sequence configuration from the base station 402, such as in a SIB or RRC message (e.g., in the configuration information 420).

In one aspect, the UE 404 may generate the preamble 422 to indicate the size of the payload 426, the TB size in the payload 426, and/or the MCS applied to the payload 426 based on one or more parameters used to generate the preamble 422. The one or more parameters may include a cyclic shift applied to a sequence, a root sequence index used for generation of a sequence, another parameter, and/or a combination of parameters (e.g., a combination of a cyclic shift and a root index). Thus, at least a portion of each possible sequence that the UE 404 may generate for the preamble 422 may correspond to at least one of the size of the payload 426, the TB size in the payload 426, and/or the MCS applied to the payload 426. Accordingly, the UE 404 may generate a sequence that corresponds to the at least one of the size of the payload 426, the TB size in the payload 426, and/or the MCS applied to the payload 426. By using a corresponding sequence in the preamble 422, the UE 404 may indicate at least one of the size of the payload 426, the TB size, and/or the MCS to the base station 402.

In another aspect, the UE 404 may determine a sequence configuration associated with the preamble 422 based on an RRC state of the UE 404 and/or a size of the cell on which the UE 404 is operating. For example, the UE 404 may use a short sequence (e.g., length 139) and/or a relatively larger SCS (e.g., 15/30 kHz) when the UE 404 is operating on a small cell and/or when the UE 404 is operating in an RRC Connected state. In another example, the UE 404 may use a long sequence (e.g., length 839) and/or a relatively smaller SCS (e.g., 1.25/5/7.5 kHz) when the UE 404 is operating on a larger cell (e.g., macro cell) and/or when the UE 404 is operating in an RRC Inactive or RRC Idle state.

With multiple UEs using sequences in preambles to indicate sizes of payloads, TB sizes configured in payloads, and/or MCSs configured for payloads, the probability of collisions may increase—that is, the base station 402 may be more likely to receive two identical preambles from two different UEs. In order to reduce the probability of preamble collision, "composite" preambles may be used to increase the pool of available preambles for msgA from different UEs. A composite preamble may include at least two sequences, and the at least two sequences may be concatenated in time/frequency, such as by orthogonal cover code (OCC).

For example, the UE 404 may generate the preamble 422 by generating a first sequence and generating at least one second sequence. The UE 404 may concatenate the first sequence and the at least one second sequence to form the preamble 422. The UE 404 may then send the preamble 422 (including the first sequence concatenated with the at least one second sequence) to the base station 402 by multiplexing the first sequence and the at least one second sequence. The UE 404 may time-division multiplex, frequency-division multiplex, and/or space-division multiplex the first sequence and the at least one second sequence to differentiate the sequences when received by the base station 402.

In some aspects, the UE 404 may indicate at least one of the size of the payload 426, the TB size in the payload 426, and/or the MCS applied to the payload 426 using a composite sequence. For example, the combination of the first sequence and the at least one second sequence may indicate at least one of the size of the payload 426, TB size, and/or MCS. In another example, each of the individual first sequence and at least one second sequence may indicate one or more of the size of the payload 426, TB size, and/or MCS.

Having generated the preamble 422, the UE 404 may assign the preamble 422 to a first set of resources for transmission to the base station 402 to initiate the two-step RACH procedure 410. The base station 402 may allocate specific sets of resources for preamble transmissions initiating two-step RACH procedures, and each of the specific sets of resources may be a RACH occasion. As the base station 402 may be configured to receive preamble transmissions on RACH occasions, the first set of resources on which to assign the preamble 422 may be associated with a RACH occasion 412.

According to some aspects, the base station 402 may indicate a set of RACH occasions, as well as information based upon which the UE 404 can select the one RACH occasion 412, in the configuration information 420. For example, the UE 404 may determine the first set of resources associated with the RACH occasion 412 based on at least one configuration in the time domain, frequency domain, and/or spatial domain, as indicated by the configuration information 420.

With respect to time domain configurations, the UE 404 may determine the first set of resources associated with the RACH occasion 412 based on a PRACH configuration index indicated in the configuration information 420, e.g., for the time-division multiplexing pattern of transmission of the preamble 422. The PRACH configuration index may indicate the available set of RACH occasions for transmission of the preamble 422, such as a set of subframes available for transmission of the preamble 422.

With respect to frequency domain configurations, the UE 404 may determine the first set of resources associated with the RACH occasion 412 based on a number of RACH occasions indicated in the configuration information 420 as available in the frequency domain at the same location in the time domain, e.g., for the frequency-division multiplexing pattern of transmission of the preamble 422. Further, the UE 404 may determine a starting frequency resource of the first set of resources associated with the RACH occasion 412 based on the configuration information 420.

With respect to spatial domain configurations, the UE 404 may determine the RACH occasion 412 associated with the first set of resources in order to indicate a beam for communication with the base station 402 based on the configuration information 420. In some aspects, each RACH occasion allocated by the base station 402 may be mapped to at least one of the SS/PBCH blocks 418a-c, and each of the SS/PBCH blocks 418a-c may correspond with a respective beam at the base station 402. The UE 404 may determine (e.g., measure) at least one value indicative of the quality of a respective beam based on the corresponding one of the SS/PBCH blocks 418a-c received via the respective beam. For example, the UE 404 may determine, for each beam via which one of the SS/PBCH blocks 418a-c is received, one or more of an RSRP, a reference signal received quality (RSRQ), a reference signal strength indicator (RSSI), a signal-to-noise ratio (SNR), and/or another similar value.

The UE 404 may determine the beam to be indicated by transmission of the preamble 422 in the RACH occasion 412 based on the values determined from the SS/PBCH blocks 418a-c. For example, the UE 404 may select the beam that corresponds with one of the SS/PBCH blocks 418a-c having a "best" value (e.g., highest RSRP, highest SNR, etc.). The UE 404 may then determine the RACH occasion 412 based on the one of the SS/PBCH blocks 418a-c having the best value. For example, each of the SS/PBCH blocks 418a-c may be mapped to a respective RACH occasion, and the UE 404 may select one RACH occasion 412 to indicate the selected beam based on the mapping between RACH occasions and SS/PBCH blocks 418a-c.

In one configuration, the UE 404 may determine the mapping between the selected one of the SS/PBCH blocks 418a-c and the RACH occasion 412 associated with the first set of resources further based on the indications in the configuration information 420 of a number of preamble sequences per SS/PBCH block and/or a number of SS/PBCH blocks associated with each of the RACH occasions. Rules and/or other information for mappings to indicate a beam selected by the UE 404 may be preconfigured (e.g., stored according to a 3GPP standard) or may be signaled to the UE 404 from the base station 402.

According to some other aspects, UE 404 may assign the preamble 422 to the first set of resources based on at least one of the size of the payload 426, the TB size in the payload 426, and/or the MCS applied to the payload 426. Accordingly, the first set of resources to which the preamble 422 is assigned may indicate the at least one of the size of the payload 426, the TB size in the payload 426, and/or the MCS applied to the payload 426 when the base station 402 receives the preamble 422.

In one aspect, the UE 404 may determine the first set of resources based on information that indicates correspondence between sets of resources and the at least one of the size of the payload 426, the TB size in the payload 426, and/or the MCS applied to the payload 426. For example, the UE 404 may access a table (e.g., a lookup table) that indicates the correspondence between sets of resources and the at least one of the size of the payload 426, TB size, and/or MCS. In various aspects, the information (e.g., table) may be predefined in the UE 404 (e.g., stored according to a 3GPP standard) or may be signaled to the UE 404 from the base station 402 (e.g., in at least one SIB).

With the preamble 422 separate from the payload 426, the UE 404 may assign the payload 426 to a second set of resources. The second set of resources may be based on a size of the cell on which the UE 404 is operating and/or the RRC state in which the UE 404 is operating. Accordingly, the UE 404 may determine at least one of the cell size of the base station 402 and/or the RRC state of the UE 404, and the UE 404 may determine a second set of resources that corresponds to the at least one of the cell size of the base station 402 and/or the RRC state of the UE 404.

In one aspect, the UE 404 may determine the second set of resources based on information that indicates correspondence between sets of resources and the at least one of the size of the cell on which the UE 404 is operating and/or the RRC state in which the UE 404 is operating. For example, the UE 404 may access a table (e.g., a lookup table) that indicates the correspondence between sets of resources and the at least one of the size of the cell on which the UE 404 is operating and/or the RRC state in which the UE 404 is operating. In another example, the second set of resources may be a function (e.g., mathematical function) of the at least one of the size of the cell on which the UE 404 is operating and/or the RRC state in which the UE 404 is operating. The UE 404 may evaluate the function with the cell size and RRC state as inputs in order to obtain the second set of resources. In various aspects, the information (e.g., table, function, etc.) may be predefined in the UE 404 (e.g., stored according to a 3GPP standard) or may be signaled to the UE 404 from the base station 402 (e.g., in at least one SIB).

The UE 404 may be identified by the base station 402 according to an identifier (ID) of the UE 404, such as a radio network temporary identifier (RNTI) (e.g., a random access (RA) RNTI, a temporary RNTI, etc.). The msgA 414 may be the first transmission by the UE 404 to the base station 402 and, therefore, the base station 402 may benefit from a mechanism for indicating the ID of the UE 404 to the base station 402 in the msgA 414, particularly because the msgA 414 may include data from the UE 404 in the payload 426. Accordingly, the UE 404 may indicate an ID of the UE 404 using one or more (or a combination of) approaches for including information in the msgA 414.

In one aspect, the UE 404 may indicate an ID of the UE 404 based on the sequence of the preamble 422. For example, a sequence index used by the UE 404 for generating the sequence of the preamble 422 may indicate the ID of the UE 404. In one aspect, different root sequence indexes may correspond to different IDs or different bits of an ID. The UE 404 may determine an ID of the UE 404, and the UE 404 may determine a root sequence index for generating the preamble 422 based on the ID of the UE 404. The UE 404 may access information that indicates correspondence between ID information (e.g., sets of bits) and the different root sequence indexes. For example, the UE 404 may access a table (e.g., a lookup table) that indicates the correspondence between ID information (e.g., sets of bits) and the different root sequence indexes. The UE 404 may generate a sequence for the preamble 422 from a root sequence index that corresponds to the ID information to be conveyed by the UE 404 to the base station 402.

In another aspect, the UE 404 may indicate an ID of the UE 404 based on a composite sequence of the preamble 422. For example, a combination of sequences and/or a combination of sequence parameters (e.g., cyclic shifts, root sequence indexes, etc.) used by the UE 404 for the composite sequence of the preamble 422 may indicate ID information (e.g., a set of bits) of the UE 404. The UE 404 may access information that indicates correspondence between ID information (e.g., sets of bits) and composite sequences. Accordingly, the UE 404 may generate a composite sequence for the preamble 422 that corresponds to ID information to be conveyed by the UE 404 to the base station 402.

In one aspect, the UE 404 may indicate an ID of the UE 404 based on the sequence of the at least one reference signal 428. For example, a DMRS sequence index used by the UE 404 for generating the at least one reference signal 428 may indicate the ID of the UE 404. In one aspect, different DMRS sequence indexes may correspond to different IDs or different bits of an ID. The UE 404 may determine an ID of the UE 404, and the UE 404 may determine a DMRS sequence index for generating the at least one reference signal 428 based on the ID of the UE 404. The UE 404 may access information that indicates correspondence between ID information (e.g., sets of bits) and the different DMRS sequence indexes. For example, the UE 404 may access a table (e.g., a lookup table) that indicates the correspondence between ID information (e.g., sets of bits) and the different DMRS sequence indexes. The UE 404 may generate a sequence for the at least one reference signal 428 from a DMRS sequence index that corresponds to the ID information to be conveyed by the UE 404 to the base station 402.

In another aspect, the UE 404 may indicate an ID of the UE 404 using a portion of the bits in the payload 426. For example, a portion of the bits of the payload 426 may be reserved for indicating ID information associated with the UE 404. Accordingly, the UE 404 may set the portion of the bits in the payload 426 to values indicating at least a portion of the ID information associated with the UE 404.

In another aspect, the UE 404 may indicate an ID of the UE 404 using a scrambling code that is used to scramble the payload 426. For example, a scrambling code used by the UE 404 for scrambling the payload 426 may indicate the ID of the UE 404. In one aspect, different scrambling codes may correspond to different IDs or different bits of an ID. The UE 404 may determine an ID of the UE 404, and the UE 404 may determine a scrambling code for scrambling the payload 426 based on the ID of the UE 404. The UE 404 may then use the determined scrambling code for scrambling the payload 426 in order to indicate ID information (e.g., a set of bits of the ID of the UE 404) associated with the UE 404 to the base station 402.

In another aspect, the UE 404 may indicate an ID of the UE 404 using a cyclic redundancy check (CRC) mask. For example, a mask used by the UE 404 for masking the CRC included in the msgA 414 may indicate the ID of the UE 404. In one aspect, different CRC masks may correspond to different IDs or different bits of an ID. The UE 404 may determine an ID of the UE 404, and the UE 404 may determine a mask used by the UE 404 for masking the CRC included in the msgA 414 based on the ID of the UE 404. The UE 404 may then mask the CRC included in the msgA 414 using the determined CRC mask in order to indicate ID information (e.g., a set of bits of the ID of the UE 404) associated with the UE 404 to the base station 402.

In one aspect, the UE 404 may use a combination of two or more of the aforementioned techniques for conveying ID information in order to indicate an ID of the UE 404 to the base station 402. For example, a root sequence index used for generation of the sequence for the preamble 422 may indicate a first set of bits and a second set of bits may be indicated in the payload 426. The base station 402 may combine the first set of bits and the second set of bits in order to obtain the full ID of the UE 404.

With the generated preamble 422 and the generated payload 426, the UE 404 may send the msgA 414 to the base station 402. The UE 404 may send the msgA 414 by first sending the preamble 422 and then sending the payload 426. When the UE 404 sends the payload 426, the reference signal 428 and the uplink data channel 430 may be in the same slot and may have the same bandwidth.

The UE 404 may send the payload 426 of the msgA 414 with or without frequency hopping in the uplink data channel 430. With or without hopping in the uplink data channel 430, the UE 404 may frontload a first of the at least one reference signal 428. Specifically, the UE 404 may assign the first of the at least one reference signal 428 to one of two possible locations: the first OFDM symbol or the third/fourth symbol of the slot in which the first of the at least one reference signal 428 and the uplink data channel 430 are sent.

The UE 404 may assign the at least one reference signal 428 to one or more symbols that are the same for the uplink data channel 430 with CP-OFDM and DFT-s-OFDM without frequency hopping. In one aspect, the UE 404 may frontload the at least one reference signal 428 according to a DMRS configuration type 1, which may support up to eight ports. With DMRS configuration type 1, the at least one reference signal 428 may be assigned to resource(s) with an interleaved frequency division multiplexing (IFDM)-based pattern having a Comb-2 pattern with CSs, assigned to one OFDM symbol having a Comb-2 pattern with two CSs for up to four ports, and/or assigned to two OFDM symbols having a Comb-2 pattern with two CSs and time domain (TD) OCC (TD-OCC) ({1 1} and {1 −1}) for up to eight ports. If the number of ports for the at least one reference signal 428 is less than or equal to four, the number of frontloaded DMRS symbols may be one or two. For the at least one reference signal 428 for CP-OFDM with extended CP (e.g., at least 60 kHz SCS), the DMRS configuration type 1 as with normal CP may be supported. In some cases, the OCC can be applied in both the time and frequency domains to increase the pool size available for the at least one reference signal 428 (e.g., DMRS).

In another aspect, the UE 404 may frontload the at least one reference signal 428 according to DMRS configuration type 2, which may support up to twelve ports. With DMRS configuration type 2, the at least one reference signal 428 may be assigned according to a frequency domain (FD) OCC (FD-OCC) pattern with adjacent REs in the frequency domain. With one OFDM symbol for the at least one reference signal 428, the at least one reference signal 428 may be assigned according to 2-FD-OCC across adjacent REs in the frequency domain for up to six ports. With two OFDM symbols for the at least one reference signal 428, the at least one reference signal 428 may be assigned according to 2-FD-OCC across adjacent REs in the frequency domain and TD-OCC (both {1 1} and {1 −1}) for up to twelve ports. If the number of ports for the at least one reference signal 428 is less than or equal to six, the number of frontloaded DMRS symbols may be one or two. In some cases, the OCC can be applied in both the time and frequency domains to increase the pool size available for the at least one reference signal 428 (e.g., DMRS).

As illustrated, the UE 404 may insert a gap 424 in time when sending the msgA 414.

The time duration of the gap 424 may be configurable by the base station 402 (e.g., in the configuration information 420), and can be zero, a fraction of an OFDM symbol, one or more OFDM symbols, or one or more slots. The gap 424 may facilitate transmission of the msgA 414 when the preamble 422 and the payload 426 differ in various ways. For example, the gap 424 the time gap may be split into a slot-level offset with a range of {1, 2, . . . , 32} and a symbol-level offset with a range of {0, 1, 2, . . . , 13}.

In one aspect, the UE 404 may transmit the msgA 414 so that the preamble 422 occupies a different bandwidth portion than the payload 426 (although the bandwidth portion occupied by the preamble 422 may at least partially overlap with the bandwidth portion occupied by the payload 426). For example, the preamble 422 may occupy a relatively smaller bandwidth than the payload 426. In another aspect, the UE 404 may transmit the msgA 414 so that the preamble 422 has a different numerology than the payload 426. For example, the UE 404 may transmit the msgA 414 so that the SCS and/or sampling rate of the preamble 422 is different from that of the payload 426. In still another aspect, the UE 404 may transmit the msgA 414 so that the preamble 422 is transmitted on a beam that is different than a beam on which the payload 426 is transmitted.

The UE 404 may transmit the msgA 414 using at least one power control scheme of the at least two different power control schemes indicated in the configuration information 420. The UE 404 may determine the at least one power control scheme to be used for msgA 414 transmission based on the MCS configured for the payload 426. According to one configuration, the UE 404 may determine to use two different power control schemes for msgA 414 transmission—that is, the UE 404 may implement different power control schemes for the transmission of the preamble 422 and the transmission of the payload 426. For example, the UE 404 may transmit the preamble 422 according to a power control scheme that power ramps or increases transmission power as the preamble 422 is transmitted (and potentially retransmitted), whereas the UE 404 may transmit the payload 426 with a power control scheme that is based on an MCS configured for the payload 426. The preamble 422 does not include any data to which an MCS can be applied, and therefore, an MCS-dependent power control scheme may be inapplicable to the preamble 422.

The base station 402 may receive the msgA 414 from the UE 404 initiating the RACH procedure 410. Depending upon the one or two power control schemes used by the UE 404 for transmission of the msgA 414, the base station 402 may receive the preamble 422 with a different (e.g., greater) power than that with which the payload 426 is received. For example, the base station 402 may receive the preamble 422 according to one power control scheme that defines the initial transmission power for the preamble 422, and another power control scheme that indicates the transmission power for the payload 426 is dependent upon the MCS configured for the payload 426.

When the base station 402 receives the preamble 422, the base station 402 may determine the configuration of the sequence (or sequences, if concatenated). Specifically, the base station 402 may determine the length of the sequence and/or the SCS configured for the preamble 422. At least one of the sequence length included in the preamble 422 and/or the SCS configured for the preamble 422 may be based on the type of cell operated by the base station 402 and/or the RRC state of the UE 404. For example, the base station 402 may determine that the preamble 422 includes a short sequence (e.g., length 139) and/or is configured with a relatively larger SCS (e.g., 15/30 kHz) when the base station 402 provides a small cell and/or when the UE 404 is operating in an RRC Connected state. In another example, the base station 402 may determine that the preamble 422 includes a long sequence (e.g., length 839) and/or a relatively smaller SCS (e.g., 1.25/5/7.5 kHz) when the base station 402 provides a larger cell (e.g., macro cell) and/or when the UE 404 is operating in an RRC Inactive or RRC Idle state.

The base station 402 may receive the preamble 422 on the first set of resources associated with the RACH occasion 412. In one aspect, the base station 402 may determine at least one of the size of the payload 426, the TB size configured for the payload 426, and/or the MCS configured for the payload 426 based on receiving the preamble 422. For example, the base station 402 may access information indicating a correspondence between sequence configurations and/or sets of resources and at least one of payload sizes, TB sizes, and/or MCSs. As described, supra, the sequence configuration of the preamble 422 and/or the first set of resources may indicate the at least one of the size of the payload 426, TB size configured for the payload 426, and/or MCS configured for the payload 426. Based on the information indicating the correspondence, the base station 402 may determine the at least one of the size of the payload 426, TB size configured for the payload 426, and/or MCS configured for the payload 426.

Based on the preamble 422, the base station 402 may receive and decode the payload 426. In some aspects, the gap 424 in time may facilitate the decoding by the base station 402, e.g., by allowing the base station 402 a period of time to adjust a processing window to correspond to the TB size, adjust the data rate to correspond to the MCS, allocate processing time for a size of the payload 426, etc.

In one aspect, the base station 402 may determine the RRC state of the UE 404 based on at least one of the size of the payload 426 and/or the MCS configured for the payload 426. For example, the base station 402 may access information indicating correspondence of one or more payload sizes and/or MCSs with RRC states. Based on the information indicating the correspondence, the base station 402 may determine the RRC state of the UE 404 by determining the corresponding one of the size of the payload 426 and/or MCS configured for the payload 426.

In still another aspect, the base station 402 may determine a beam selected by the UE 404 based on receiving the preamble 422 on the first set of resources associated with the RACH occasion 412. For example, the RACH occasion 412 in which the preamble 422 is received may be mapped to a beam at the base station 402. Each RACH occasion allocated by the base station 402 may be mapped to at least one of the SS/PBCH blocks 418a-c, and each of the SS/PBCH blocks 418a-c may correspond with a respective beam at the base station 402. The base station 402 may determine a beam selected by the UE 404 for communication based on the at least one of the SS/PBCH blocks 418a-c that is mapped to the RACH occasion 412.

The mapping between the RACH occasion 412 and the at least one of the SS/PBCH blocks 418a-c may be based on the number of RACH occasions available in the frequency for the two-step RACH procedure 410, the number of preamble sequences per each of the SS/PBCH blocks 418a-c, the number of SS/PBCH blocks associated with each RACH occasion, and/or other similar information, which may be indicated in the configuration information 420. Rules and/or other information for mappings associated with the determination by the base station 402 of the beam selected by the UE 404 may be preconfigured at the base station 402 (e.g., stored according to a 3GPP standard).

Further, in order to identify the source of the msgA 414, the base station 402 may determine the ID of the UE 404. The base station 402 may determine the ID of the UE 404 based on one or more of (or a combination of) a preamble sequence index associated with the preamble 422, a DMRS sequence index associated with the at least one reference signal 428 in the payload 426, a subset set of a set of bits in the payload 426, a scrambling code applied to the payload, and/or a mask applied to a CRC included in the msgA 414.

In response to the msgA 414, the base station 402 may generate a msgB 416. The base station 402 may generate the msgB 416 to include control information on a downlink control channel 432 (e.g., a PDCCH) and data on a downlink data channel (e.g., a PDSCH). The base station 402 may send the msgB 416 to the UE 404 to complete the RACH procedure 410. The UE 404 may receive the msgB 416, and the UE 404 may acquire uplink timing synchronization based on the msgB 416.

Figure 5:
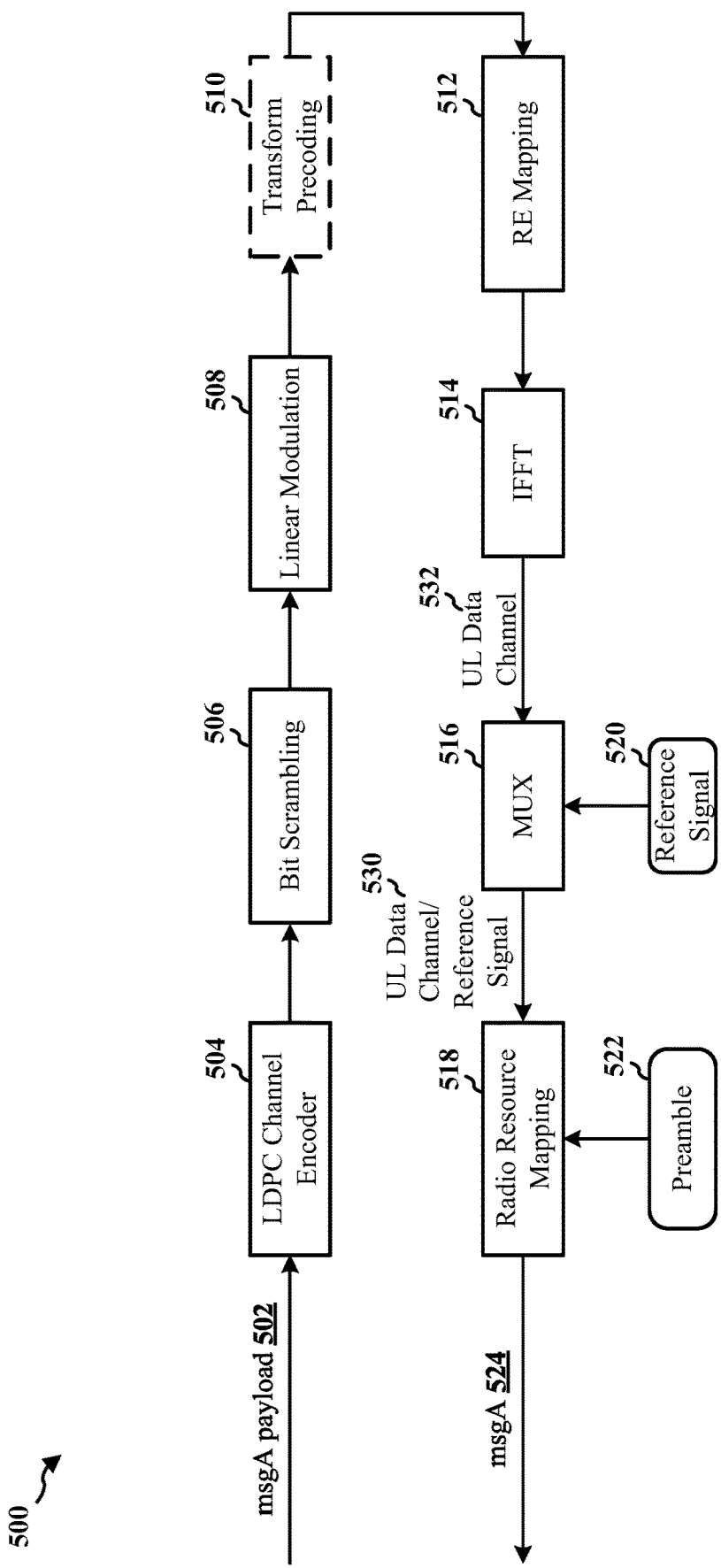
FIG. 5 is a block diagram of a transmit chain for a message of a random access channel procedure.

Now referring to FIG. 5, illustrates a TX chain 500 associated with transmission of a msgA 524 from a UE to a base station. For example, the msgA 524 may be the msgA 414 sent by the UE 404 to the base station 402, as illustrated in FIG. 4. A UE may generate a payload 502 of a msgA. The payload 502 may include uplink data to be transmitted by the UE to a base station. For example, the payload 502 may include data retrieved from a buffer of the UE. In some aspects, the size of the payload 502 may be associated with an RRC state of the UE. The payload 502 may be provided to the TX chain 500 for transmission to the base station.

In the TX chain 500, a low-density parity-check (LDPC) channel encoder 504 may generate and apply error correcting code to the payload 502. Further, bit scrambling 506 may be applied to the payload 502 in order to provide a level of encryption to the payload 502.

The payload 502 may be modulated with linear modulation 508 to generate a waveform for the payload 502. If enable, transform precoding 510 may be applied, which may generate complex-valued symbols for the payload 502. Next, the payload 502 may be mapped to REs on a grid according to RE mapping 512. An IFFT 514 may be applied to produce an uplink data channel 532 (e.g., a PUSCH) carrying a time domain OFDM symbol stream for the payload 502.

A multiplexer (MUX) 516 may then multiplex the uplink data channel 532 (carrying the payload 502) with at least one reference signal 520 (e.g., at least one DMRS) in the time and/or frequency domain, e.g., to provide for channel estimation. In some aspects, the multiplexed uplink data channel/reference signal 530 may be assigned to TBs and an MCS may be applied thereto. The MCS and/or the size of the TBs may be configured based on an RRC state in which the UE is operating and/or based on a size of the cell on which the UE is operating. For example, a table (e.g., a lookup table) may indicate a respective TB size and/or MCS configuration for each RRC state and/or cell size and, according to the RRC state of the UE and/or cell size, the TB size and MCS for the uplink data channel/reference signal 530 may be configured. The uplink data channel/reference signal 530 may be provided for radio resource mapping 518.

A preamble 522 may be generated in association with the uplink data channel/reference signal 530. In one aspect, the preamble 522 may be generated based on the uplink data channel/reference signal 530. For example, the preamble 522 may be generated based on a sequence configuration that corresponds to the TB size, MCS, size of the payload 502, and/or RRC state of the UE. In some aspects, the sequence configuration may include a cyclic shift, root sequence index, and/or combination thereof for generation of the preamble 522 that corresponds to at least one of the TB size, MCS, and/or size of the payload 502. In some other aspects, at least one of the length of the sequence and/or the SCS configured for the preamble 522 may be based on at least one of the type of cell operated by the base station and/or the RRC state of the UE. The sequence configuration may be signaled to the UE by the base station in a SIB or via RRC signaling.

In some aspects, the preamble 522 may be comprised of a plurality of sequences. For example, multiple sequences may be concatenated in the time and/or frequency domain (e.g., by OCC) to construct a "composite" preamble. Each of the individual sequences may be generated using a root sequence index and cyclic shift(s), and then the individual sequences may be time-division multiplexed, frequency-division multiplexed, and/or space-division multiplexed.

At the radio resource mapping 518, the preamble 522 may be assigned to a first set of resources associated with a RACH occasion. In one aspect, the first set of resources associated with the RACH occasion may be determined based on a beam selected by the UE. That is, the UE may select a "good" or "best" beam for communication with the base station, such as a beam via which an SS/PBCH block having a highest RSRP is received or a beam via which an SS/PBCH block having an RSRP that satisfies a threshold is received. The UE may indicate the selected beam to the base station by mapping information indicating the selected beam (e.g., an SS/PBCH block corresponding to the selected beam) to the RACH occasion associated with the first set of resources.

In some other aspects, the first set of resources associated with the RACH occasion may be allocated based on the uplink data channel/reference signal 530. For example, the first set of resources may be allocated for the preamble 522 based on at least one of the TB size, MCS, and/or size of the payload 502. The first set of resources on which the preamble 522 is carried may correspond to at least one of the TB size, MCS, and/or size of the payload 502 and, therefore, the first set of resources may indicate the at least one of the TB size, MCS, and/or size of the payload 502. The corresponding resource allocation for the first set of resources to indicate the at least one of the TB size, MCS, and/or size of the payload 502 may be signaled to the UE in a SIB or via RRC signaling.

Further at the radio resource mapping 518, the uplink data channel/reference signal 530 may be mapped to a second set of resources, which may be allocated based on a size of a cell on which the UE is operating and/or based on an RRC state in which the UE is operating. In some aspects, the resource allocation for the second set of resources may be signaled by a SIB or via RRC signaling from a base station to the UE, may be predefined by a math function, or may be predefined by a table (e.g., lookup table) with respect to the preamble 522.

The preamble 522 and the uplink data channel/reference signal 530 (carrying the payload 502) may be time-division multiplexed so that the preamble 522 is transmitted on the first set of resources associated with the RACH occasion before the uplink data channel/reference signal 530 is transmitted on the second set of resources.

In some aspects, a gap in time may be inserted between the preamble 522 and the uplink data channel/reference signal 530 at the radio resource mapping 518. The gap may be configurable at the UE by the base station, such as via a SIB or RRC signaling. The gap may be a number of slots (including fractions), a number of symbols (including fractions), or zero.

In the aggregate, the preamble 522 and uplink data channel/reference signal 530 (and optional gap) may comprise the msgA 524 of a RACH procedure (e.g., two-step RACH procedure). Subsequently, the TX chain 500 may apply the signal representing the preamble 522 to an antenna for transmission on the first set of resources associated with the RACH occasion and may apply the signal representing the uplink data channel/reference signal 530 to the antenna for transmission on the second set of resources.

The msgA 524 may be transmitted using at least one of at least two different power control schemes configured at the UE by the base station. For example, a first power control scheme may define an initial transmission power and a power ramping step for retransmissions, whereas a second power control scheme may be dependent upon an MCS configured for the uplink data channel/reference signal 530 (in which the payload 502 is carried). The first power control scheme may be used for transmission of the preamble 522, while the second (MCS-dependent) power control scheme may be used for transmission of the uplink data channel/reference signal 530.

In some aspects, the preamble 522 may occupy a different bandwidth portion than the uplink data channel/reference signal. In addition, the preamble 522 may be transmitted on a different beam than the uplink data channel/reference signal 530. Further, the numerology (e.g., SCS) with which the preamble 522 is transmitted may be different than that with which the uplink data channel/reference signal 530 is transmitted.

Figure 6:
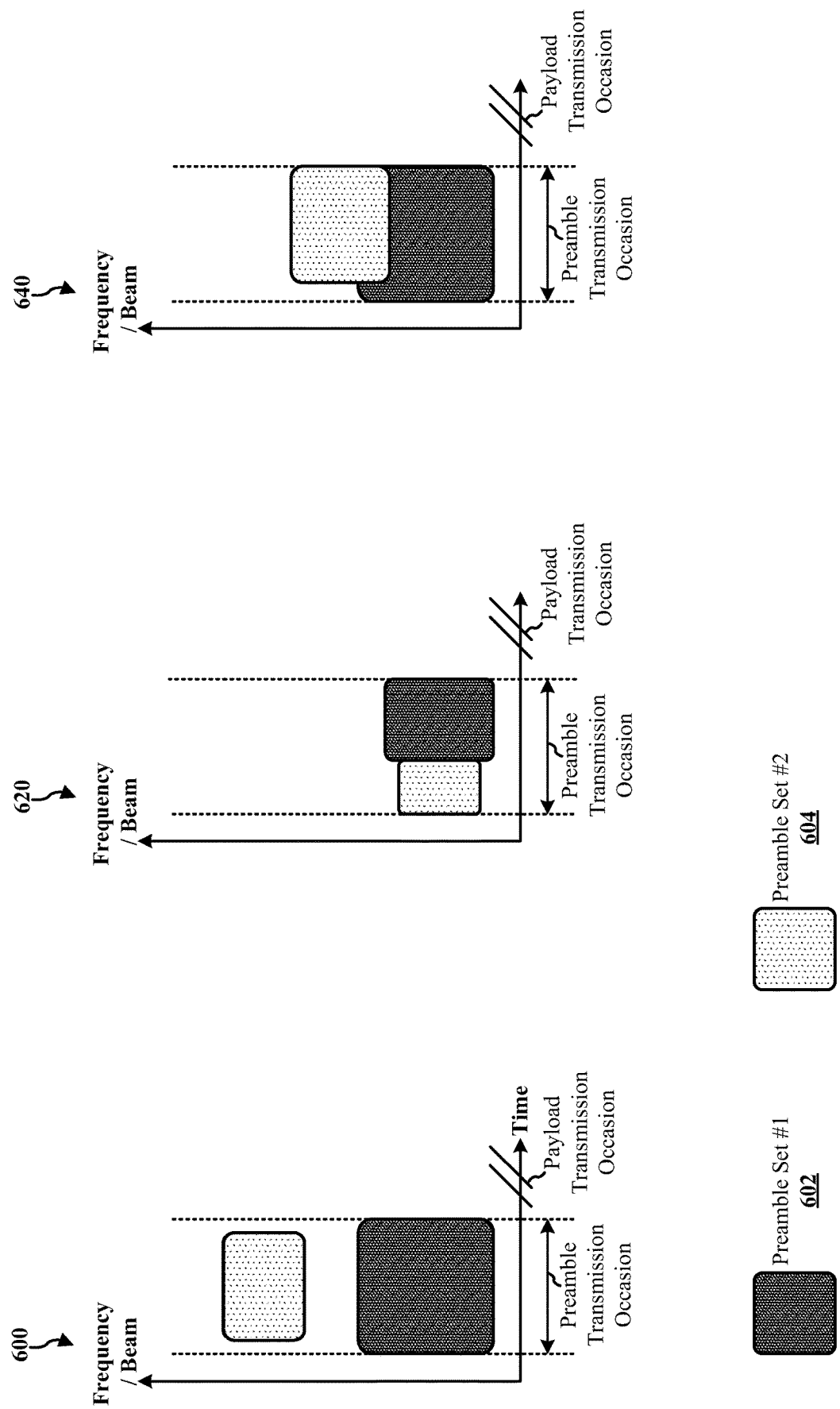
FIG. 6 is a block diagram of resource allocations and sequence configurations for preambles of random access channel procedures.

Turning to FIG. 6, a block diagram illustrates resource allocations and sequence configurations for preambles transmitted by UEs in RACH procedures (e.g., two-step RACH procedures). In various aspects, two preamble sets 602, 604 may be transmitted (e.g., by different UEs)—e.g., a preamble set may include a set of sequences, such as a set of sequences generated according to a root sequence index within a first range and/or a number of cyclic shifts within a second range. The first preamble set 602 may be associated with a first TB size and/or MCS configuration, whereas the second preamble set 604 may be associated with a second TB size and/or MCS configuration. For example, a preamble corresponding to the first preamble set 602 may be used by UEs to indicate a msgA includes a payload having a first TB size and first MCS, whereas a preamble corresponding to the second preamble set 604 may be used by other UEs to indicate a msgA includes a payload having a second TB size and a second MCS.

A UE (e.g., the UE 404) may transmit a preamble (e.g., the preamble 422) corresponding to the first preamble set 602 or the second preamble set 604 during a preamble transmission occasion (e.g., a RACH occasion), which may be followed in time (e.g., after an optional gap) by a payload transmission occasion during which the UE may transmit a payload (e.g., the payload 426). The UE may transmit a msgA (e.g., the msgA 414) for a RACH procedure (e.g., the two-step RACH procedure 410) by transmitting the preamble in the preamble transmission occasion (e.g., the RACH occasion 412) and transmitting the payload in the payload transmission occasion.

According to a first configuration 600, the first preamble set 602 may be separated from the second preamble set 604 by frequency and/or space/beam but may at least partially overlap in time. For example, a preamble of the first preamble set 602 may be time-division multiplexed on a wireless channel with a preamble of the second preamble set 604.

In some aspects, a preamble of the first preamble set 602 may be carried in a first set of subcarriers, whereas a preamble of the second preamble set 604 may be carried in a second set of subcarriers that does not overlap with the first set of subcarriers. However, a preamble of the first preamble set 602 may be carried in a first set of set of symbols occurring during a first portion of the preamble transmission occasion, and a preamble of the second preamble set 604 may be carried in a second set of symbols occurring at least partially in the first portion of the preamble transmission occasion.

In some aspects, in order to indicate the first TB size and/or first MCS, a UE would assign a preamble to a first set of REs comprised of the first set of subcarriers and the first set of symbols. Similarly, in order to indicate the second TB size and/or second MCS, a UE would assign a preamble to a second set of REs comprised of the second set of subcarriers and the second set of symbols. Because preambles of the first preamble set 602 may be distinguishable from those of the second preamble set 604 based on subcarrier allocation, the sequence configurations for the first preamble set 602 may at least partially overlap with that of the second preamble set 604 (e.g., a preamble generated for the first preamble set 602 may be the same as a preamble generated for the second preamble set 604).

According to a second configuration 620, the first preamble set 602 may be separated from the second preamble set 604 in time but may at least partially overlap in frequency and/or space/beam. For example, a preamble of the first preamble set 602 may be frequency-division multiplexed on a wireless channel with a preamble of the second preamble set 604.

In some aspects, a preamble of the first preamble set 602 may be carried in a first set of subcarriers, and a preamble of the second preamble set 604 may be at least partially carried in the first set of subcarriers. However, a preamble of the first preamble set 602 may be carried in a first set of set of symbols during a first portion of the preamble transmission occasion, whereas a preamble of the second preamble set 604 may be carried in a second set of symbols during a second portion of the preamble transmission occasion that does not overlap with the first portion.

Thus, in order to indicate the first TB size and/or first MCS, a UE would generate a preamble of the first preamble set 602 and/or assign a preamble to a first set of REs comprised of the first set of subcarriers and the first set of symbols. Similarly, in order to indicate the second TB size and second MCS, a UE would generate a preamble of the second preamble set 604 and/or assign a preamble to a second set of REs comprised of the second set of subcarriers and the second set of symbols. Because preambles of the first preamble set 602 may be distinguishable from those of the second preamble set 604 based on symbol allocation, the sequence configurations for the first preamble set 602 may at least partially overlap with that of the second preamble set 604 (e.g., a preamble generated for the first preamble set 602 may be the same as a preamble generated for the second preamble set 604).

According to a third configuration 640, the first preamble set 602 may be separated from the second preamble set 604 by sequence configuration, but may at least partially overlap in time and in frequency and/or space/beam. For example, a preamble of the first preamble set 602 may be code-division multiplexed on a wireless channel with a preamble of the second preamble set 604.

In some aspects, a preamble of the first preamble set 602 may be generated according to a first set of RACH parameters, such as a first root sequence index and/or a first number of cyclic shifts. However, preambles of the second preamble set 604 may be generated according to a second set of RACH parameters that includes a different root sequence index and/or a different number of cyclic shifts. Because preambles are distinguishable based on whether the preamble was generated according to the sequence configuration for the first preamble set 602 or the second preamble set 604, preambles of the first preamble set 602 and the second preamble set 604 may overlap in time and/or frequency or space/beam. Thus, a preamble of the first preamble set 602 may occur on a first set of time/frequency resources, and a preamble of the second preamble set 604 may also occur at least partially on the first set of time/frequency resources.

In order to indicate the first TB size and/or first MCS, a UE would generate a preamble according to the sequence configuration of the first preamble set 602. Similarly, in order to indicate the second TB size and second MCS, a UE would generate a preamble according to the sequence configuration of the second preamble set 604. Because preambles of the first preamble set 602 may be distinguishable from those of the second preamble set 604 based on their respective sequence configurations, the time/frequency resources allocated for the first preamble set 602 may at least partially overlap with those allocation for the second preamble set 604 (e.g., a preamble generated for the first preamble set 602 may be allocated resources that at least partially overlap with resources allocated for a preamble generated for the second preamble set 604).

Figure 7:
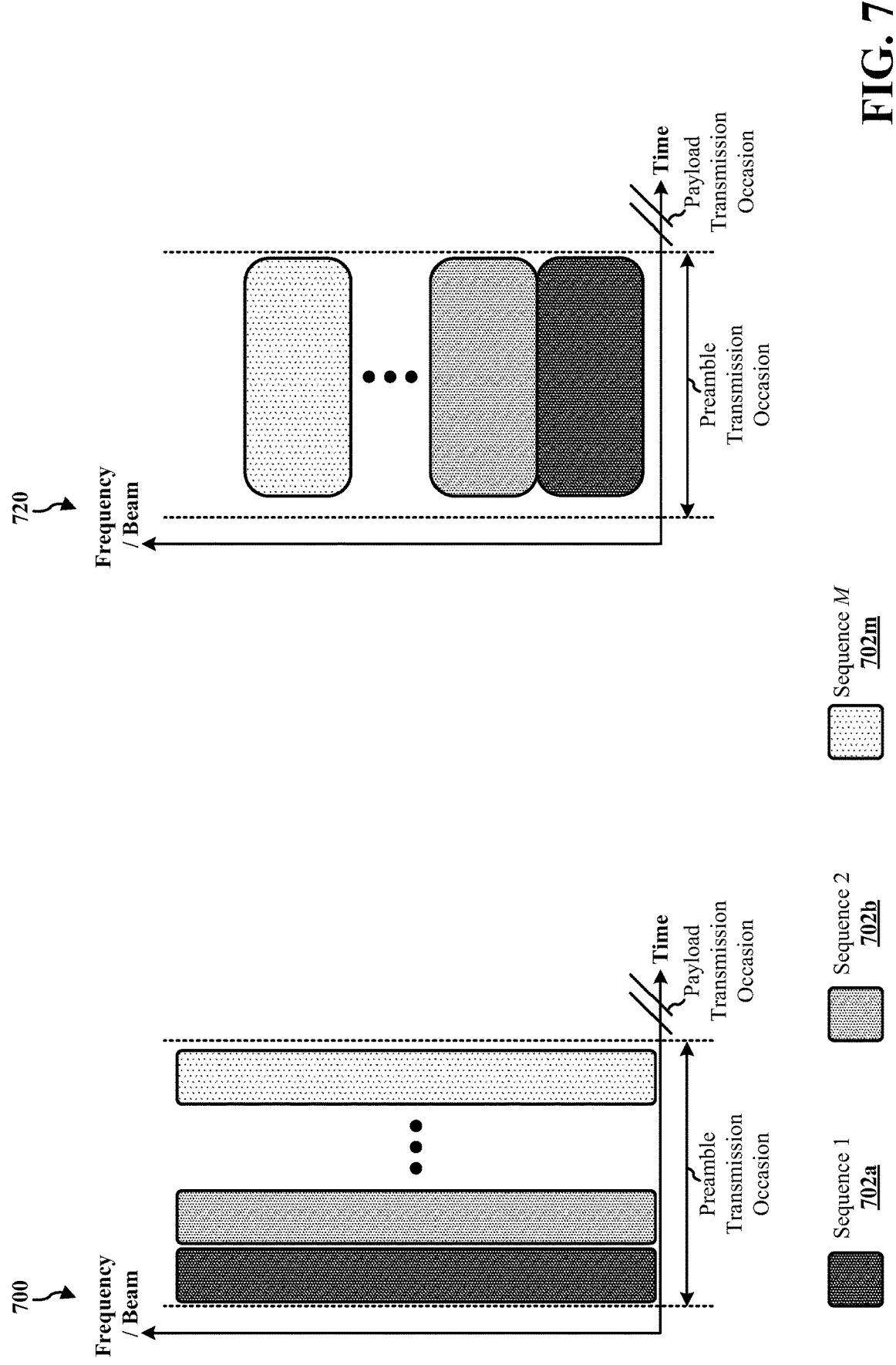
FIG. 7 is a block diagram of composite preambles for messages of random access channel procedures.

FIG. 7 illustrates a block diagram of configurations 700, 720 of composite sequences.

In the context of FIG. 4, the UE 404 may generate the preamble 422 to include a plurality of sequences 702*a*, 702*b*, 702*m*. The UE 404 may then transmit the msgA 414 including the plurality of sequences 702*a*, 702*b*, 702*m* as the preamble 422 during the RACH occasion 412 (e.g., a preamble transmission occasion). Following transmission of the preamble 422, the UE 404 may transmit the payload 426 during the payload transmission occasion.

According to the first configuration 700, a UE may generate three sequences 702*a*, 702*b*, 702*m*. The sequences 702*a*, 702*b*, 702*m* may be respectively generated according to three different sequence configurations—e.g., three different sequence configurations that differ with respect to at least one of a root sequence index and/or a number of cyclic shifts. The UE may concatenate the sequences 702*a*, 702*b*, 702*m*, e.g., using OCC. To distinguish the sequences 702*a*, 702*b*, 702*m* from one another, the UE may time-division multiplex the sequences 702*a*, 702*b*, 702*m*. Accordingly, the UE may transmit a first sequence 702*a* during a first portion of the preamble transmission occasion, a second sequence 702*b* during a second portion of the preamble transmission occasion, and an $m^{th}$ sequence 702*m* during an $m^{th}$ portion of the preamble transmission occasion. In some aspects, the sequences 702*a*, 702*b*, 702*m* may occupy the same set of subcarriers and/or may be transmitted on the same beam(s).

A UE may generate three sequences 702*a*, 702*b*, 702*m*. The sequences 702*a*, 702*b*, 702*m* may be respectively generated according to the same sequence configuration or different sequence configurations—e.g., sequence configurations that differ with respect to at least one of a root sequence index and/or a number of cyclic shifts. The UE may concatenate the sequences 702*a*, 702*b*, 702*m*, e.g., using OCC.

According to the first configuration 700, to distinguish the sequences 702*a*, 702*b*, 702*m* from one another, the UE may time-division multiplex the sequences 702*a*, 702*b*, 702*m*. Accordingly, the UE may transmit a first sequence 702*a* during a first portion of the preamble transmission occasion, a second sequence 702*b* during a second portion of the preamble transmission occasion, and an $m^{th}$ sequence 702*m* during an $m^{th}$ portion of the preamble transmission occasion. In some aspects, the sequences 702*a*, 702*b*, 702*m* may occupy the same set of subcarriers and/or may be transmitted on the same beam(s).

According to the second configuration 720, to distinguish the sequences 702*a*, 702*b*, 702*m* from one another, the UE may frequency-division multiplex and/or space-division multiplex the sequences 702*a*, 702*b*, 702*m*. Accordingly, the UE may transmit a first sequence 702*a* in a first set of subcarriers and/or on a first beam, a second sequence 702*b* in a second set of subcarriers and/or on a second beam, and an $m^{th}$ sequence 702*m* in an $m^{th}$ set of subcarriers and/or on an $m^{th}$ beam. In some aspects, sequences 702*a*, 702*b*, 702*m* may at least partially occur during the same time during the preamble transmission occasion.

Figure 8:
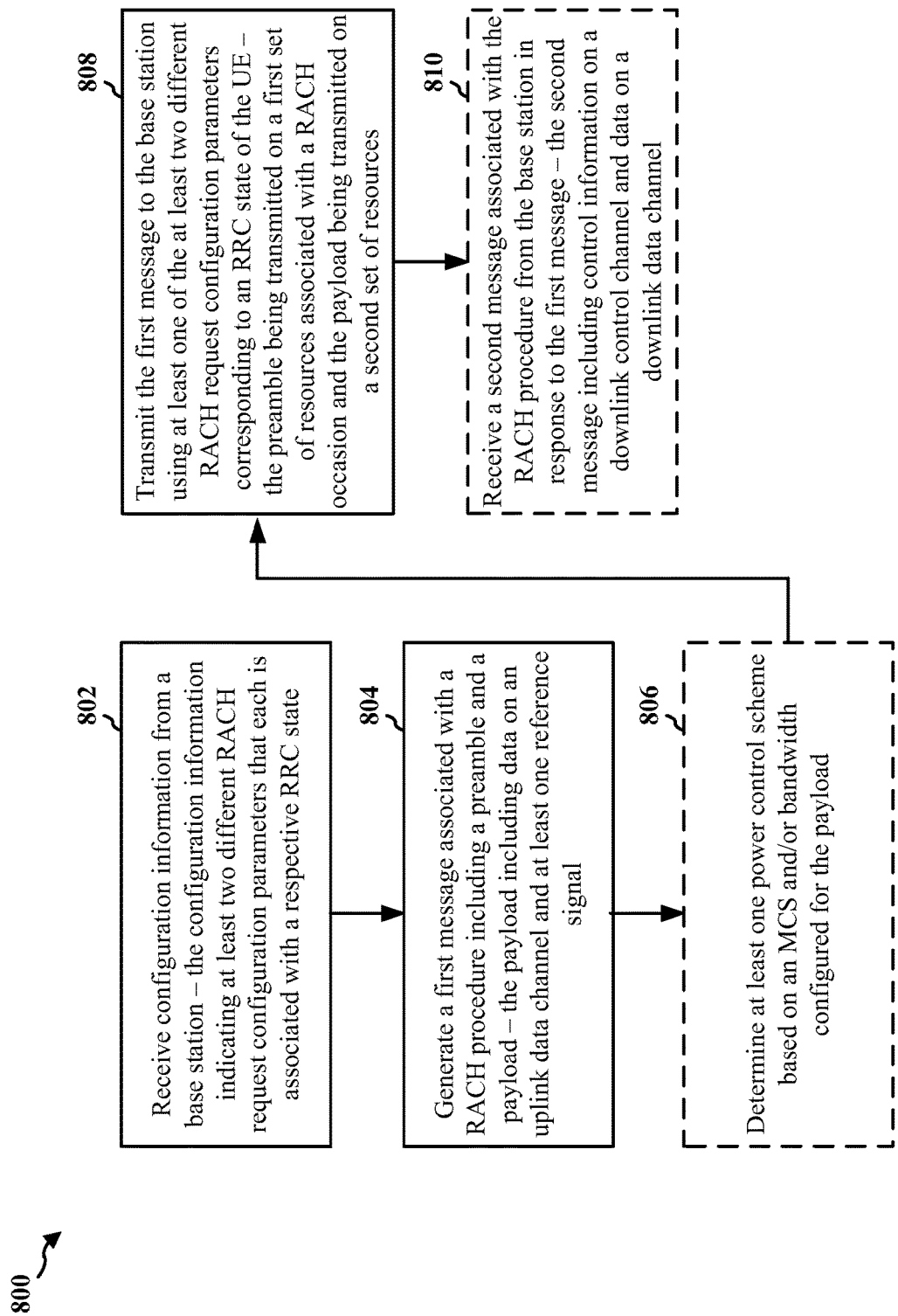
FIG. 8 is a flowchart of a method of wireless communication by a UE.

FIG. 8 is a flowchart of a method 800 of wireless communication. The method 800 may be performed by a UE (e.g., the UE 104, 350, 404; the apparatus 1202/1202'; the processing system 1314, which may include the memory 360 and which may be the entire UE 104, 350, 404 or a component of the UE 104, 350, 404, such as the TX processor 368, the RX processor 356, and/or the controller/processor 359). One or more of the illustrated operations may be omitted, transposed, or contemporaneous. Various optional operations may be illustrated with dashed lines.

At operation 802, the UE may receive configuration information from a base station. The UE may receive the configuration information in at least one of a SIB or an RRC message from the base station. In some aspects, the configuration information may be received in two or more messages. For example, referring to FIG. 4, the UE 404 may receive the configuration information 420 from the base station 402.

The configuration information may at least two different RACH request configuration parameters associated with transmission of a first message for a two-step RACH procedure. Each of the at least two different RACH request configuration parameters may be associated with a respective RRC state, such as RRC Idle, RRC Inactive, or RRC Connected. For example, the configuration information may indicate at least two different preamble groups, at least two different payload sizes, at least two different MCSs, at least two different time and frequency resource allocations, and/or or at least two different power control schemes. According to various aspects, the configuration information may further indicate a number of RACH occasions available for the RACH procedure, a starting frequency resource associated with the RACH occasions, a number of preamble sequences per SS/PBCH block, and/or a number of SS/PBCH blocks associated with each of the RACH occasions.

At operation 804, the UE may generate a first message associated with RACH procedure including a preamble and a payload. For example, the first message may be a msgA of a two-step RACH procedure. To generate the first message, the UE may generate the preamble and may generate at least one reference signal for the payload. The first message may be associated with one or more uplink data channel (e.g., PUSCH) occasions and one or more reference signals (e.g., DMRSs), and thus, the UE may multiplex data on the one or more uplink data channel occasions and the at one or more reference signals for the payload. In some aspects, the UE may further multiplex and/or otherwise piggyback UCI with the data on the one or more uplink data channel occasions and the one or more DMRSs for the payload. For example, referring to FIG. 4, the UE 404 may generate the msgA 414 associated with the two-step RACH procedure 410, and the UE 404 may generate the msgA 414 to include the preamble 422 and the payload 426.

The UE may determine an MCS to be applied to the payload. In some aspects, at least one of the MCS configured for the payload and/or the size of the payload may be associated with the RRC state of the UE. In some other aspects, the UE may generate the preamble of the first message to indicate at least one of the MCS configured for the payload and/or the size of the payload. In some further aspects, the UE may generate the preamble based on a sequence, and at least one of the length of the sequence and/or an SCS configured for the preamble may be based on at least one of the type of cell operated by the base station and/or the RRC state of the UE.

At operation 806, the UE may determine at least one power control scheme to be used for transmission of the first message. In some aspects, the UE may determine the at least one power control scheme based on the MCS configured for the payload. In some other aspects, the UE may determine the at least one power control scheme based on a bandwidth configured for the payload. For example, the UE may determine at least two different power control schemes indicated by the received configuration information, and the UE may select one power control scheme for the preamble. Further, the UE may select another power control scheme based on the MCS configured for the payload and/or based on the bandwidth configured for the payload, such as by identifying an MCS-dependent and/or bandwidth-dependent power control scheme indicated in the received configuration information that corresponds with the MCS and/or bandwidth, respectively, configured for the payload.

According to various aspects, the UE may determine two different power control schemes for transmission of the first message: a first power control scheme for transmission of the preamble of the first message and a second power control scheme for transmission of the payload of the first message. The first power control scheme may include an initial transmission power and a power ramping step for retransmissions, whereas the second power control scheme may be determined based on the MCS and/or bandwidth configured for the payload. The UE may determine the two different power control schemes based on the received configuration information, which may indicate at least two different power control schemes associated with transmission of the first message for the RACH procedure.

For example, referring to FIG. 4, the UE 404 may determine at least one power control scheme to be used for transmission of the payload 426 of the msgA 414 based on the MCS and/or bandwidth configured for the payload 426. The UE 404 may determine the at least one power control scheme based on the received configuration information 420, which may indicate at least two different power control schemes.

At operation 808, the UE may transmit the first message to the base station using at least one of the at least two different RACH request configuration parameters. The at least one of the at least two different RACH request configuration parameters may correspond to an RRC state of the UE. For example, the UE may transmit the first message to the base station using the determined power control scheme of the at least two different power control schemes, which may correspond to the RRC state of the UE. The UE may transmit the first message to the base station to initiate a two-step RACH procedure with the base station. The UE may transmit the preamble of the first message using the aforementioned first power control scheme, and may transmit the payload of the first message using the aforementioned second (MCS-dependent and/or bandwidth-dependent) power control scheme.

The UE may transmit the preamble of the first message on a first set of resources associated with a RACH occasion, and may transmit the payload of the first message on a second set of resources. According to various aspects, the UE may transmit the preamble on a different bandwidth portion (or part) than the payload, via a different beam pair than the payload, and/or with a different SCS than the payload.

In some aspects, the UE may transmit the preamble based on at least one configuration for the first set of resources associated with the RACH occasion in the time domain, the frequency domain, and/or the spatial domain. For example, the UE may determine the first set of resources associated with the RACH occasion based on one or more of the following, as indicated in the received configuration information: the configuration index (e.g., a PRACH configuration index) associated with the at least one configuration in the time domain, the number of RACH occasions available for the RACH procedure associated with the at least one configuration in the frequency domain, the starting frequency resource associated with the RACH occasions, the number of preamble sequences per SS/PBCH block, and/or the number of SS/PBCH blocks associated with each of the RACH occasions.

Further, the UE 404 may insert a time gap between the preamble and the payload when transmitting the first message. The time gap may be a number of slots (including a fractional number), a number of symbols (including a fractional number), or may be zero. The duration (e.g., number of slots or symbols) may be configurable by the base station for the UE. For example, the configuration information received by the UE may indicate the duration of the time gap.

For example, referring to FIG. 4, the UE 404 may transmit the msgA 414 to the base station 402 using at least one power control scheme of at least two different power control schemes configured by the base station 402 for the UE 404 (e.g., via the configuration information 420). The UE 404 may transmit the preamble 422 on a first set of resources associated with the RACH occasion 412, and may transmit the payload 426 on a second set of resources. In some aspect, the UE 404 may insert the gap 424 between the preamble 422 and the payload 426 of the msgA 414, and the duration of the gap 424 may be configured by the base station 402 (e.g., via the configuration information 420).

At operation 810, the UE may receive a second message associated with the RACH procedure from the base station. The second message may include control information on a downlink control channel (e.g., a PDCCH) and data on a downlink data channel (e.g., PDSCH). The second message may be a msgB that is associated with contention resolution, fallback, and/or msgA retransmission. Effectively, the second message (e.g., msgB) may enable completion of the two-step RACH procedure initiated by the UE through transmission of the first message—e.g., the two-step RACH procedure may be completed when the UE transmits an acknowledgement (ACK) message in response to the received msgB.

For example, referring to FIG. 4, the UE 404 may receive the msgB 416 from the base station 402 to complete the two-step RACH procedure 410, which may be initiate by the msgA 414 transmitted by the UE 404 to the base station 402. The msgB 416 may include control information on the downlink control channel 432 (e.g., PDCCH) and data on the downlink data channel 434 (e.g., PDSCH).

Figure 9:
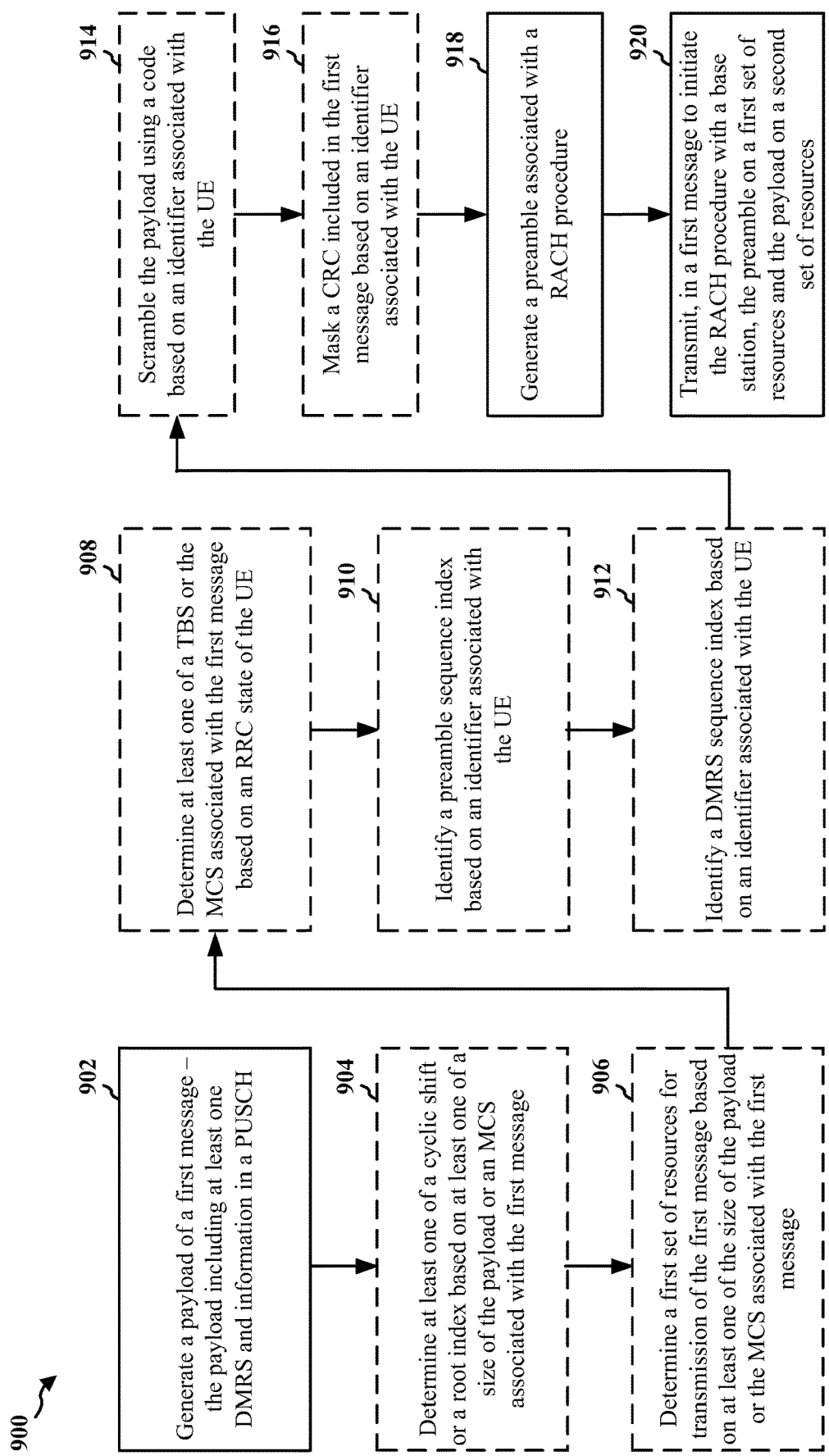
FIG. 9 is a flowchart of a method of wireless communication by a UE.

With reference to FIG. 9, a flowchart illustrates a method 900 of wireless communication. The method 900 may be performed by a UE (e.g., the UE 104, 350, 404; the apparatus 1202/1202'; the processing system 1314, which may include the memory 360 and which may be the entire UE 104, 350, 404 or a component of the UE 104, 350, 404, such as the TX processor 368, the RX processor 356, and/or the controller/processor 359). One or more of the illustrated operations may be omitted, transposed, or contemporaneous. Various optional operations may be illustrated with dashed lines.

At operation 902, the UE may generate a payload of a first message. The payload may include at least one DMRS and data in a PUSCH. In one aspect, a portion of the information in the PUSCH at least partially indicates an ID associated with the UE. For example, referring to FIG. 4, the UE 404 may generate the payload 426 of the msgA 414, which may include the at least one reference signal 428 and the uplink data channel 430. Referring to FIG. 5, the UE may generate a payload 502 that may be configured for transmission in the TX chain 500 to comprise the uplink data channel/reference signal 530 of the msgA 524.

At operation 904, the UE may determine at least one of a cyclic shift or root sequence index based on at least one of a size of the payload and/or MCS associated with the first message. Referring to FIG. 4, the UE 404 may determine at least one of a cyclic shift or root sequence index for the preamble 422 based on at least one of a size of the payload 526 and/or the MCS to be applied to the payload 526. Referring to FIG. 5, the UE may generate the preamble 522 based on at least one of a size of the payload 502 and/or an MCS to be applied to the uplink data channel/reference signal 530 of the payload 502. Referring to the third configuration 640 of FIG. 6, the UE may generate a preamble according to a sequence configuration for the first preamble set 602 in order to indicate a first MCS and first TB size, or the UE may generate a preamble according to a sequence configuration for the second preamble set 604 in order to indicate a second MCS and a second TB size.

At operation 906, the UE may determine a first set of resources for transmission of the first message based on at least one of the size of the payload and/or the MCS associated with the first message. Referring to FIG. 4, the UE 404 may determine a first set of resources for transmission of the preamble 422 of the msgA 414 based on at least one of a size of the payload 426 and/or the MCS to be applied to the payload 426 of the msgA 414. Referring to FIG. 5, the radio resource mapping 518 may occur in the TX chain 500 for the preamble 522. Referring to the first configuration 600 of FIG. 6, the UE may transmit a preamble of the first preamble set 602 in a first set of symbols and a first set of subcarriers in order to indicate a first MCS and first TB size, and the UE may transmit a preamble of the second preamble set in at least partially the first set of symbols but in a second set of subcarriers to indicate a second MCS and a second TB size. Referring to the second configuration 620 of FIG. 6, the UE may transmit a preamble of the first preamble set 602 in a first set of symbols and a first set of subcarriers in order to indicate a first MCS and first TB size, and the UE may transmit a preamble of the second preamble set in a second set of symbols but in at least partially the first set of subcarriers to indicate a second MCS and a second TB size.

At operation 908, the UE may determine at least one of a TB size or MCS associated with the first message based on an RRC state of the UE. Referring to FIG. 4, the UE 404 may determine at least one of a TB size for the payload 426 or MCS associated with the payload 426 of the msgA 414 based on an RRC state of the UE 404.

At operation 910, the UE may identify a preamble sequence index based on an ID associated with the UE. Referring to FIG. 4, the UE 404 may identify a preamble sequence index for generation of the preamble 422 based on an ID associated with the UE 404.

At operation 912, the UE may identify a DMRS sequence index based on an ID associated with the UE. In one aspect, the UE may generate the payload based on the DMRS sequence identified based on the ID associated with the UE. Referring to FIG. 4, the UE 404 may identify a DMRS sequence index for generation of the at least one reference signal 428 based on an ID associated with the UE 404.

At operation 914, the UE may scramble the payload using a code based on an ID associated with the UE. Referring to FIG. 4, the UE 404 may scramble the payload 426 using a code based on an ID associated with the UE 404. Referring to FIG. 5, bit scrambling 506 may be applied to the payload 502 in the TX chain 500 based on an ID associated with the UE 404.

At operation 916, the UE may mask a CRC included in the first message based on an ID associated with the UE. Referring to FIG. 4, the UE 404 may mask a CRC included in the msgA 414 based on an ID associated with the UE 404. Referring to FIG. 5, the LDPC channel encoder 504 may mask a CRC included with the payload 502 in the TX chain 500 based on an ID associated with the UE 404.

At operation 918, the UE may generate a preamble associated with a RACH procedure. In one aspect, the UE may generate the preamble based on at least one of a size of the payload or an MCS associated with the first message. In one aspect, the UE may generate the preamble based on at least one of the cyclic shift or the root index identified based on the at least one of the size of the payload or the MCS associated with the first message. In one aspect, the UE may generate the preamble based on the preamble sequence index identified based on an ID associated with the UE. Referring to FIG. 4, the UE may generate the preamble 422 associated with the RACH procedure 410. Referring to FIG. 5, the UE may generate the preamble 522. Referring to FIG. 7, the UE may generate a preamble to include a set of concatenated sequences 702a, 702b, 702m, which may be time-division multiplexed as illustrated in the first configuration 700 or frequency-division/space-division multiplexed as illustrated in the second configuration 720.

At operation 920, the UE may transmit, in a first message to initiate the RACH procedure with a base station, the preamble on a first set of resources and the payload on a second set of resources. In some aspects, a gap in time may be included in the first message between the preamble and the payload. In one aspect, the second set of resources is based on at least one of a size of the cell provided by the base station or an RRC state of the UE. In one aspect, the preamble may be transmitted with a different transmission power than the payload. In one aspect, the preamble occupies a different bandwidth portion than the payload. In one aspect, the preamble is transmitted on a different beam than the payload. In one aspect, the preamble is transmitted with a different SCS than the payload. Referring to FIG. 4, the UE 404 may transmit, in the msgA 414 to initiate the RACH procedure 410 with the base station 402, the preamble 422 on a first set of resources and the payload 426 on a second set of resources. Referring to FIG. 5, the radio resource mapping 518 in the TX chain 500 may assign the preamble 522 to a first set of resources and may assign the uplink data channel/reference signal 530 to a second set of resources, and the TX chain 500 may transmit the msgA 524 including the preamble 522 and the uplink data channel/reference signal 530.

Figure 10:
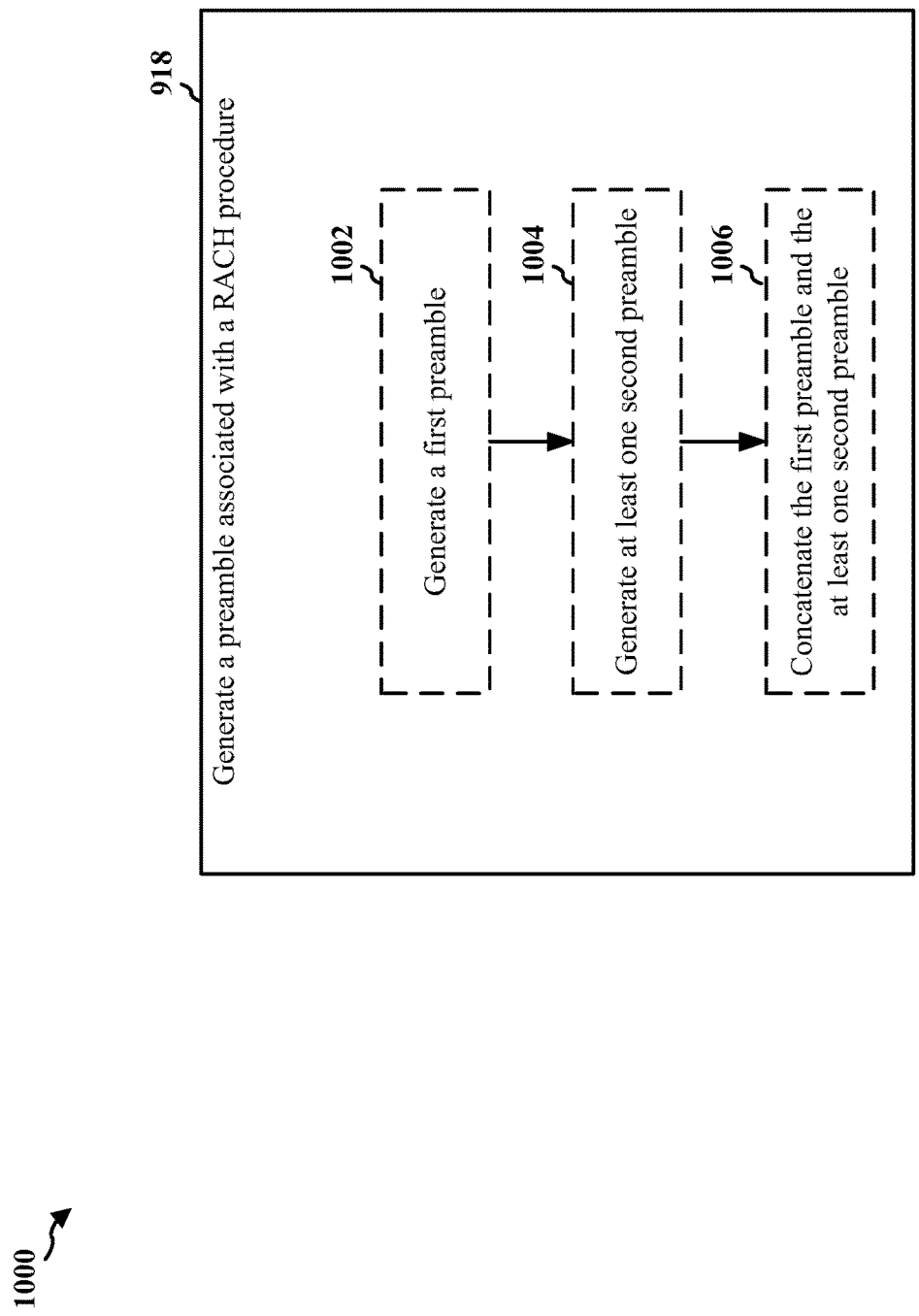
FIG. 10 is a flowchart of a method of wireless communication by a UE.

FIG. 10 is a flowchart of a method 1000 for operation 918, at which a the UE generates a preamble associated with a RACH procedure. At operation 1002, the UE may generate a first preamble. Referring to FIG. 4, the UE 404 may generate a first sequence for the preamble 422. Referring to FIG. 5, the UE may generate a first sequence for the preamble 522. Referring to FIG. 7, the UE may generate a first sequence 702a of the sequences 702a, 702b, 702m for transmission in the preamble transmission occasion.

At operation 1004, the UE may generate at least one second preamble. Referring to FIG. 4, the UE 404 may generate at least one second sequence for the preamble 422. Referring to FIG. 5, the UE may generate at least one second sequence for the preamble 522. Referring to FIG. 7, the UE may generate the second through $m^{th}$ sequences 702b, 702m for transmission in the preamble transmission occasion.

At operation 1006, the UE concatenate the first preamble and the at least one second preamble. In various aspects, the first preamble and the at least one second preamble may be one of time-division multiplexed, frequency-division multiplexed, or space-division multiplexed. Referring to FIG. 4, the UE 404 may concatenate the first sequence and the at least one second sequence for the preamble 422. Referring to FIG. 5, the UE may concatenate the first sequence and the at least one second sequence for the preamble 522. Referring to the first configuration 700 of FIG. 7, the UE may concatenate the sequences 702a, 702b, 702m by time-division multiplexing the sequences 702a, 702b, 702m in different sets of symbols and sending the sequences 702a, 702b, 702m in a same set of subcarriers and/or on a same beam. Referring to the second configuration 720 of FIG. 7, the UE may concatenate the sequences 702a, 702b, 702m by frequency-division multiplexing in different sets of subcarriers and/or space-division multiplexing the sequences 702a, 702b, 702m on different beams and sending the sequences 702a, 702b, 702m in a same set of symbols.

Figure 11:
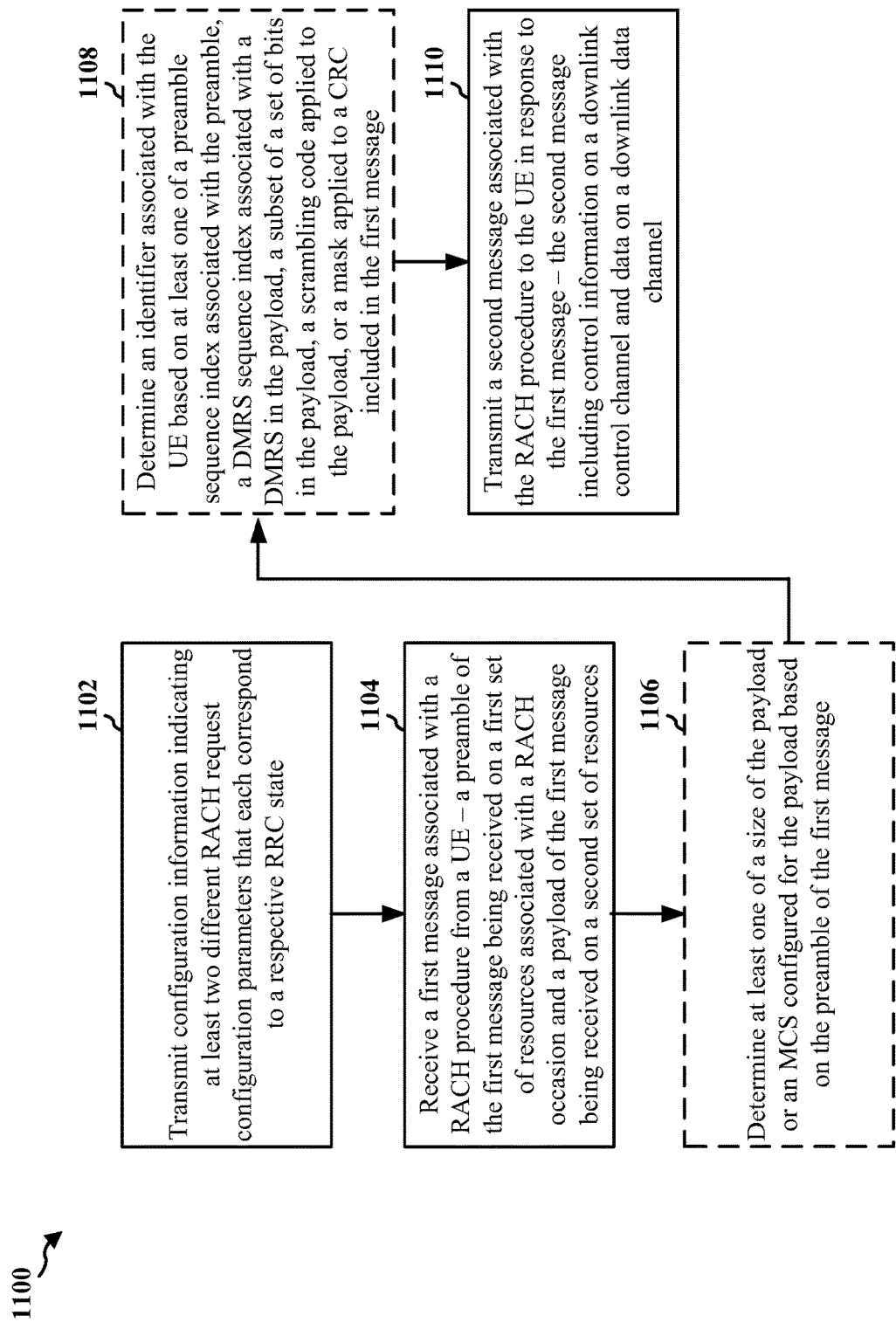
FIG. 11 is a flowchart of a method of wireless communication by a base station.

Referring now to FIG. 11, a flowchart shows a method 1100 of wireless communication. The method 1100 may be performed by a base station (e.g., the base station 102/180, 310, 402; the apparatus 1402/1402'; the processing system 1514, which may include the memory 376 and which may be the entire base station 102/180, 310, 402 or a component of the base station 102/180, 310, 402, such as the TX processor 316, the RX processor 370, and/or the controller/processor 375). One or more of the illustrated operations may be omitted, transposed, or contemporaneous. Various optional operations may be illustrated with dashed lines.

At operation 1102, the base station may transmit configuration information indicating at least two different RACH request configuration parameters associated with a RACH procedure. For example, the RACH procedure may be a two-step RACH procedure, and the at least two different RACH request configuration parameters may indicate at least two different preamble groups, at least two different payload sizes, at least two different MCSs, at least two different time and frequency resource allocations, and/or or at least two different power control schemes. Each of the at least two different RACH request configuration parameters may correspond to a respective RRC state in which a UE may operate, such as RRC Idle, RRC Inactive, or RRC Connected. The base station may transmit the configuration in one or more messages, such as in at least one SIB and/or via RRC signaling to the UE. For example, referring to FIG. 4, the base station 402 may transmit the configuration information 420, which may include information associated with the RACH procedure 410.

In some aspects, the configuration information may indicate at least two different power control schemes associated with transmission of a first message for a two-step RACH procedure. According to various aspects, the configuration information may further indicate at least one configuration in the time domain, the frequency domain, and/or the spatial domain for a first set of resources associated with a RACH occasion on which at least a portion of a first message for the RACH procedure is to be transmitted. For example, the configuration information may indicate at least one of a configuration index (e.g., a PRACH configuration index) associated with the at least one configuration in the time domain, a number of RACH occasions available for the RACH procedure associated with the at least one configuration in the frequency domain, a starting frequency resource associated with the RACH occasions, a number of preamble sequences per SS/PBCH block, and/or a number of SS/PBCH blocks associated with each of the RACH occasions.

In some other aspects, the configuration information may indicate a correspondence between each RRC state of a set of RRC states and at least one of a TB size or an MCS associated with the first message. Additionally or alternatively, the configuration information may indicate a correspondence one or more sequence configurations and at least one of a type of cell operated by the base station and/or an RRC state of a UE. For example, the configuration information may indicate at least one of a sequence length associated with a preamble of the RACH procedure and/or SCS associated with the first message of the RACH procedure corresponding with at last one of a type of cell operated by the base station and/or an RRC state of a UE.

At operation 1104, the base station may receive a first message associated with the RACH procedure from a UE based on the configuration information. For example, the first message may be a msgA initiating a two-step RACH procedure. A preamble of the first message may be received on a first set of resources associated with a RACH occasion and a payload of the first message may be received on a second set of resources. The second set of resources may be used for the transmission of msgA payload (e.g., DMRS and data carried on a PUSCH), which may be referred to as "PUSCH occasion with associated DMRS signal." The payload may include at least one reference signal (e.g., at least one DMRS) and data on an uplink data channel (e.g., a PUSCH). For example, referring to FIG. 4, the base station 402 may receive, from the UE 404, the msgA 414 associated with initiation of the RACH procedure 410. The base station 402 may receive the preamble 422 of the msgA 414 on a first set of resources and may receive the payload 426 of the msgA 414 on a second set of resources.

The first message may include a gap in time between the preamble and the payload. The gap in time may be a number of slots (including fractional numbers), a number of symbols (including fractional numbers), or may be zero. The gap in time may be configured by the base station for the UE, e.g., via the transmitted configuration information.

In one aspect, the preamble may comprise a first preamble and at least one second preamble concatenated with the first preamble, and the first preamble and the at least one second preamble may be time-division multiplexed, frequency-division multiplexed, or space-division multiplexed. In one aspect, the configuration information may indicate the second set of resource in which the payload is located. In one aspect, the preamble occupies a different bandwidth portion than the payload, the preamble is received on a different beam than the payload, and/or the preamble is received with a different SCS than the payload.

At operation 1106, the base station may determine at least one of a size of the payload or an MCS configured for the payload based on the preamble of the first message. Referring to FIG. 4, the base station 402 may determine at least one of a size of the payload 426 and/or an MCS applied to the payload 426 based on the preamble 422 of the msgA 414.

In some other aspects, the base station may determine the at least one of the size of the payload or the MCS associated with the first message based on at least one of the first set of resources in which the preamble is located or a sequence configuration of the preamble. In a further aspect, at least one of the size of the payload and/or the MCS configured for the payload indicates an RRC state of the UE. Accordingly, the base station may determine the RRC state of the UE based on at least one of the size of the payload and/or the MCS configured for the payload. In still another aspect, at least one of a sequence length associated with the preamble and/or an SCS associated with receiving the first message is based on at least one of the type of cell operated by the base station and/or the RRC state of the UE. For example, the base station may determine the RRC state of the UE based on at least one of a sequence length associated with the preamble and/or an SCS associated with receiving the first message.

At operation 1108, the base station may determine an ID associated with the UE based on at least one of a preamble sequence index associated with the preamble, a DMRS sequence associated with at least one reference signal in the payload, a subset of a set of bits (e.g., data bits on the uplink data channel) in the payload, a scrambling code applied to the payload, and/or a mask applied to a CRC included in the first message. Referring to FIG. 4, the base station 402 may determine an ID associated with the UE 404 based on at least one of a preamble sequence index associated with the preamble 422, a DMRS sequence associated with the at least one reference signal 428 in the payload 426, a subset of a set of bits in the payload 426, a scrambling code applied to the payload 426, and/or a mask applied to a CRC included in the msgA 414.

At operation 1110, the base station may transmit a second message associated with the RACH procedure to the UE in response to the first message. For example, the second message may be a msgB that completes the two-step RACH procedure. The second message may include control information on a downlink control channel (e.g., a PDCCH) and data on a downlink data channel (e.g., a PDSCH). Referring to FIG. 4, the base station 402 may send, to the UE 404 in response to the msgA 414, the msgB 416 associated with completion of the RACH procedure 410. The msgB 416 may include control information on the downlink control channel 432 and data on the downlink data channel 434.

Figure 12:
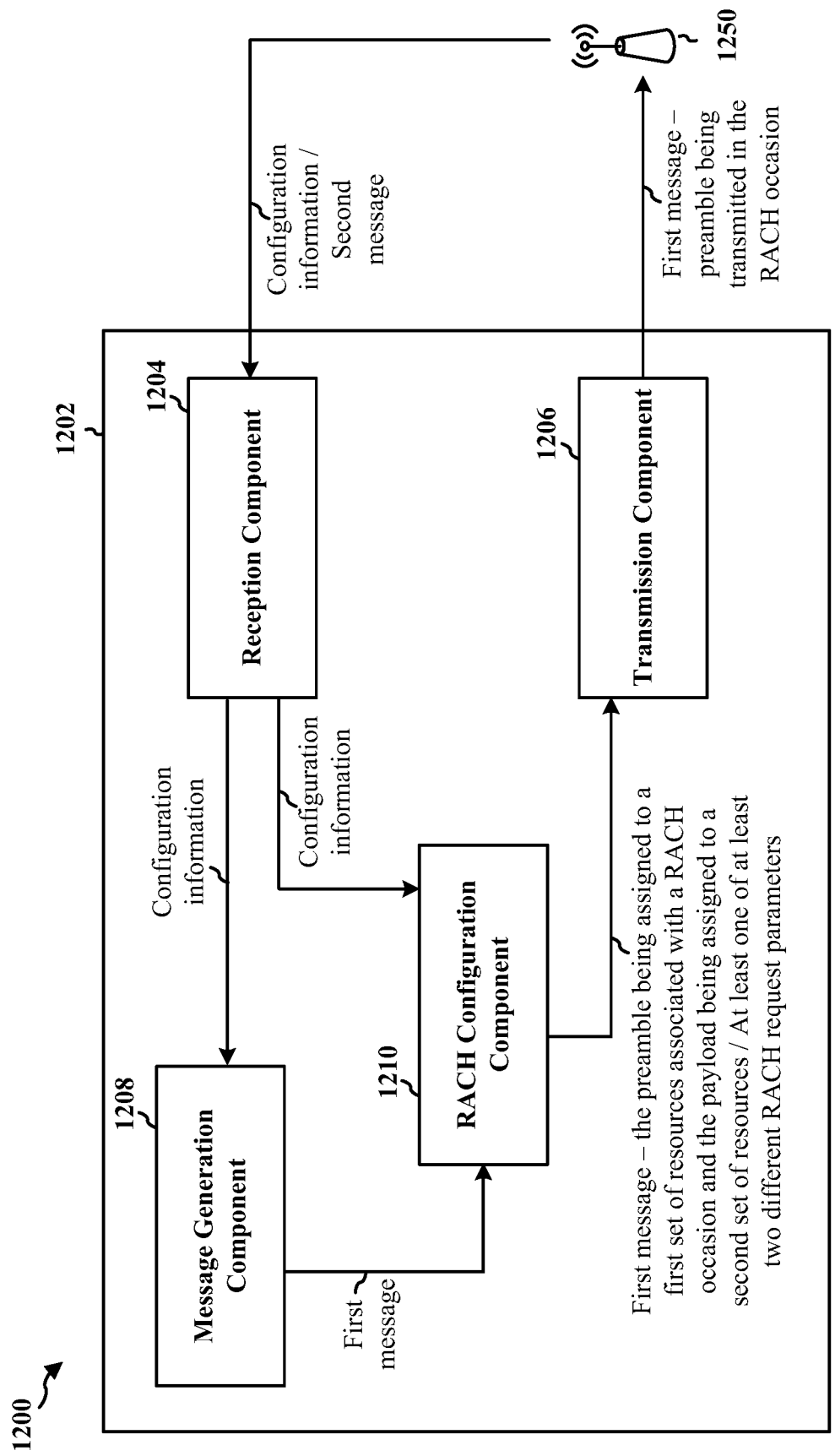
FIG. 12 is a conceptual data flow diagram illustrating the data flow between different means/components in an example apparatus.

FIG. 12 is a conceptual data flow diagram illustrating the data flow 1200 between different means/components in an example apparatus 1202. The apparatus 1202 may be a UE. The apparatus 1202 may include a reception component 1204 configured to receive configuration information from a base station 1250 that indicates at least two different power control schemes, e.g., as described in connection with operation 802 of FIG. 8. The configuration information may be included in at least one of a SIB and/or an RRC message from the base station 1250.

In some aspects, the configuration information may indicate at least one configuration in the time domain, frequency domain, and/or spatial domain for a first set of resources associated with a RACH occasion on which a msgA may be transmitted to the base station 1250. For example, the configuration information may indicate at least one of a configuration index (e.g., a PRACH configuration index) associated with the at least one configuration in the time domain, a number of RACH occasions available for a RACH procedure associated with the at least one configuration in the frequency domain, a starting frequency resource associated with the RACH occasions, a number of preamble sequences per SS/PBCH block, and/or a number of SS/PBCH blocks associated with each of the RACH occasions.

The apparatus 1202 may further include a message generation component 1208 configured to generate a first message associated with a RACH procedure, e.g., as described in connection with operation 804 of FIG. 8. The first message may be a msgA of a two-step RACH procedure, and may include a preamble and a payload. The payload may include data on an uplink data channel and at least one reference signal. In some aspects, the uplink data channel may be a PUSCH, and the at least one reference signal may be a DMRS.

In some aspects, the message generation component 1208 may generate the preamble to indicate at least one of a size of the payload or an MCS configured for the payload. In some other aspects, an RRC state of the apparatus 1202 may be associated with at least one of the size of the payload or the MCS configured for the payload. In some further aspects, at least one of a sequence length associated with the preamble or an SCS associated with the first message may be based on at least one of a type of cell operated by the base station 1250 and/or the RRC state of the apparatus 1202.

The message generation component 1208 may generate the first message to include a time gap between the preamble and the payload of the first message. The time gap may be a number of slots and/or symbols, including fractional numbers. Potentially, the time gap may be zero. The base station 1250 may configure the time gap for the message generation component 1208, such as via RRC signaling.

The apparatus 1202 may further include a RACH configuration component 1210 configured to determine at least one power control scheme associated with transmission of the first message, e.g., as described in connection with operation 806 of FIG. 8. The RACH configuration component 1210 may determine the at least one power control scheme based on at least two different power control schemes indicated in the received configuration information.

The RACH configuration component 1210 may determine the at least one power control scheme based on the MCS configured for the payload. In some aspects, the RACH configuration component 1210 may determine two different power control schemes for transmission of the first message: one power control scheme for transmission of the preamble of the first message, and another power control scheme (e.g., an MCS-dependent power control scheme) for transmission of the payload of the first message.

The RACH configuration component 1210 may assign the preamble to a first set of resources associated with a RACH occasion, and may assign the payload to a second set of resources. For example, the preamble may be assigned to occupy a different bandwidth portion (e.g., bandwidth part) than the payload. In some aspects, the RACH configuration component 1210 may assign the preamble for transmission via a different beam pair than the payload. In some other aspects, the RACH configuration component 1210 may configure the preamble with a different SCS than the payload.

The RACH configuration component 1210 may determine the RACH occasion associated with the first set of resources to which the preamble is assigned based on the indication in the received configuration information of at least one configuration in the time domain, frequency domain, and/or spatial domain. For example, the RACH configuration component 1210 may determine the RACH occasion based on at least one of the configuration index (e.g., a PRACH configuration index) associated with the at least one configuration in the time domain, the number of RACH occasions available for a RACH procedure associated with the at least one configuration in the frequency domain, the starting frequency resource associated with the RACH occasions, the number of preamble sequences per SS/PBCH block, and/or the number of SS/PBCH blocks associated with each of the RACH occasions.

The apparatus 1202 may further include a transmission component 1206 configured to transmit the first message to the base station 1250 using the at least one power control scheme (determined by the RACH configuration component 1210) of the at least two different power control schemes configured by the base station 1250 (e.g., via the received configuration information), e.g., as described in connection with operation 808 of FIG. 8. For example, the first message may be a msgA that initiates a two-step RACH procedure. The transmission component 1206 may transmit the preamble on the first set of resources associated with the RACH occasion, and may transmit the payload on the second set of resources, as configured by the RACH configuration component 1210.

The transmission component 1206 may transmit the preamble according to a different one of the at least two power control schemes configured by the base station 1250 than that of the payload (e.g., the payload may be transmitted with an MCS-dependent power control scheme, whereas the power control scheme according to which the preamble is transmitted may not be MCS-dependent).

The reception component 1204 of the apparatus 1202 may be further configured to receive a second message associated with the RACH procedure from the base station 1250, e.g., as described in connection with operation 810 of FIG. 8. For example, the second message may be a msgB that completes the two-step RACH procedure. The second message may include control information on a downlink control channel (e.g., a PDCCH) and data on a downlink data channel (e.g., a PDSCH).

The apparatus 1202 may include additional components that perform each of the blocks of the algorithm in the aforementioned flowcharts of FIGS. 8-10. As such, each block in the aforementioned flowcharts of FIGS. 8-10 may be performed by a component and the apparatus 1202 may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 13:
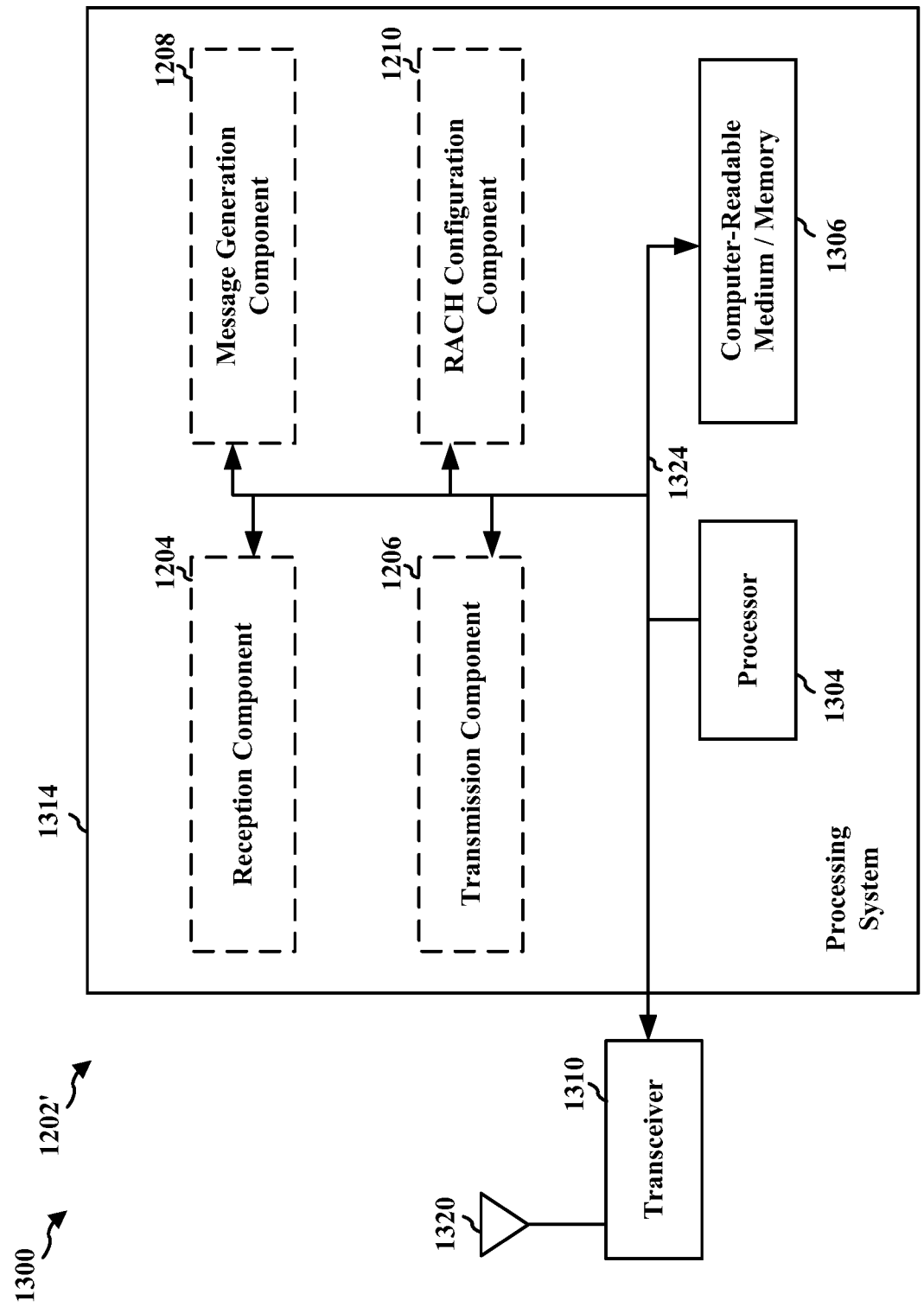
FIG. 13 is a diagram illustrating an example of a hardware implementation for an apparatus employing a processing system.

FIG. 13 is a diagram illustrating an example of a hardware implementation 1300 for an apparatus 1202' employing a processing system 1314. The processing system 1314 may be implemented with a bus architecture, represented generally by the bus 1324. The bus 1324 may include any number of interconnecting buses and bridges depending on the specific application of the processing system 1314 and the overall design constraints. The bus 1324 links together various circuits including one or more processors and/or hardware components, represented by the processor 1304, the components 1204, 1206, 1208, 1210 and the computer-readable medium/memory 1306. The bus 1324 may also link various other circuits such as timing sources, peripherals, voltage regulators, and power management circuits, which are well known in the art, and therefore, will not be described any further.

The processing system 1314 may be coupled to a transceiver 1310. The transceiver 1310 is coupled to one or more antennas 1320. The transceiver 1310 provides a means for communicating with various other apparatus over a transmission medium. The transceiver 1310 receives a signal from the one or more antennas 1320, extracts information from the received signal, and provides the extracted information to the processing system 1314, specifically the reception component 1204. In addition, the transceiver 1310 receives information from the processing system 1314, specifically the transmission component 1206, and based on the received information, generates a signal to be applied to the one or more antennas 1320. The processing system 1314 includes a processor 1304 coupled to a computer-readable medium/memory 1306. The processor 1304 is responsible for general processing, including the execution of software stored on the computer-readable medium/memory 1306. The software, when executed by the processor 1304, causes the processing system 1314 to perform the various functions described supra for any particular apparatus. The computer-readable medium/memory 1306 may also be used for storing data that is manipulated by the processor 1304 when executing software. The processing system 1314 further includes at least one of the components 1204, 1206, 1208, 1210. The components may be software components running in the processor 1304, resident/stored in the computer readable medium/memory 1306, one or more hardware components coupled to the processor 1304, or some combination thereof. The processing system 1314 may be a component of the UE 350 and may include the memory 360 and/or at least one of the TX processor 368, the RX processor 356, and the controller/processor 359. Alternatively, the processing system 1314 may be the entire UE (e.g., see 350 of FIG. 3).

In one configuration, the apparatus 1202/1202' for wireless communication includes means for receiving configuration information from a base station, the configuration information indicating at least two different random access channel (RACH) request configuration parameters that each is associated with a respective radio resource control (RRC) state; means for generating a first message associated with a two-step RACH procedure including a preamble and a payload, the payload including data on an uplink data channel and at least one reference signal; and means for transmitting the first message to the base station using at least one of the at least two different RACH request configuration parameters that corresponds to an RRC state of the UE, the preamble being transmitted on a first set of resources associated with a RACH occasion and the payload being transmitted on a second set of resources.

In one aspect, the uplink data channel includes a PUSCH, and the at least one reference signal includes a DMRS. In one aspect, the configuration information is included in at least one of a SIB or a RRC message from the base station. The apparatus 1202/1202' may further include means for determining at least one power control scheme for transmission of the first message based on a MCS and bandwidth configured for the payload, and the at least one power control scheme may be included in the at least two different RACH request configuration parameters.

In one aspect, the preamble and the payload are transmitted using different ones of the at least two different RACH request configuration parameters. In one aspect, the first message comprises a time gap between the preamble and the payload, and the time gap comprises a configurable number of slots or symbols between the preamble and the payload. In one aspect, the preamble indicates at least one of a size of the payload or a MCS configured for the payload. In one aspect, the configuration information indicates at least one configuration in a time domain, a frequency domain, or a spatial domain for the first set of resources associated with the RACH occasion. The configuration information may indicate at least one of: a PRACH configuration index associated with at least one RACH occasion configuration in the time domain, a number of RACH occasions available for the RACH procedure associated with the at least one configuration in the frequency domain, a starting frequency resource associated with the RACH occasions, a number of preamble sequences per SS/PBCH block, or a number of SS/PBCH blocks associated with each of the RACH occasions.

In one aspect, the RRC state of the UE is associated with at least one of a size of the payload or a MCS configured for the payload. In one aspect, at least one of a sequence length associated with the preamble or a subcarrier spacing associated with the transmitting the first message is based on at least one of a type of a cell operated by the base station or the RRC state of the UE. In one aspect, the preamble occupies a different bandwidth portion than the payload, the preamble is transmitted with a different target power or a different power ramping step size than the payload, the preamble is transmitted via a different beam pair than the payload, or the preamble is transmitted with a different subcarrier spacing than the payload.

In one aspect, the apparatus 1202/1202' may further include means for receiving a second message associated with the two-step RACH procedure from the base station in response to the first message, wherein the second message includes control information on a downlink control channel and data on a downlink data channel. In one aspect, the first message comprises a msgA initiating the two-step RACH procedure and the second message comprises a msgB enabling completion of the two-step RACH procedure.

The aforementioned means may be one or more of the aforementioned components of the apparatus 1202 and/or the processing system 1314 of the apparatus 1202' configured to perform the functions recited by the aforementioned means. As described supra, the processing system 1314 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 14:
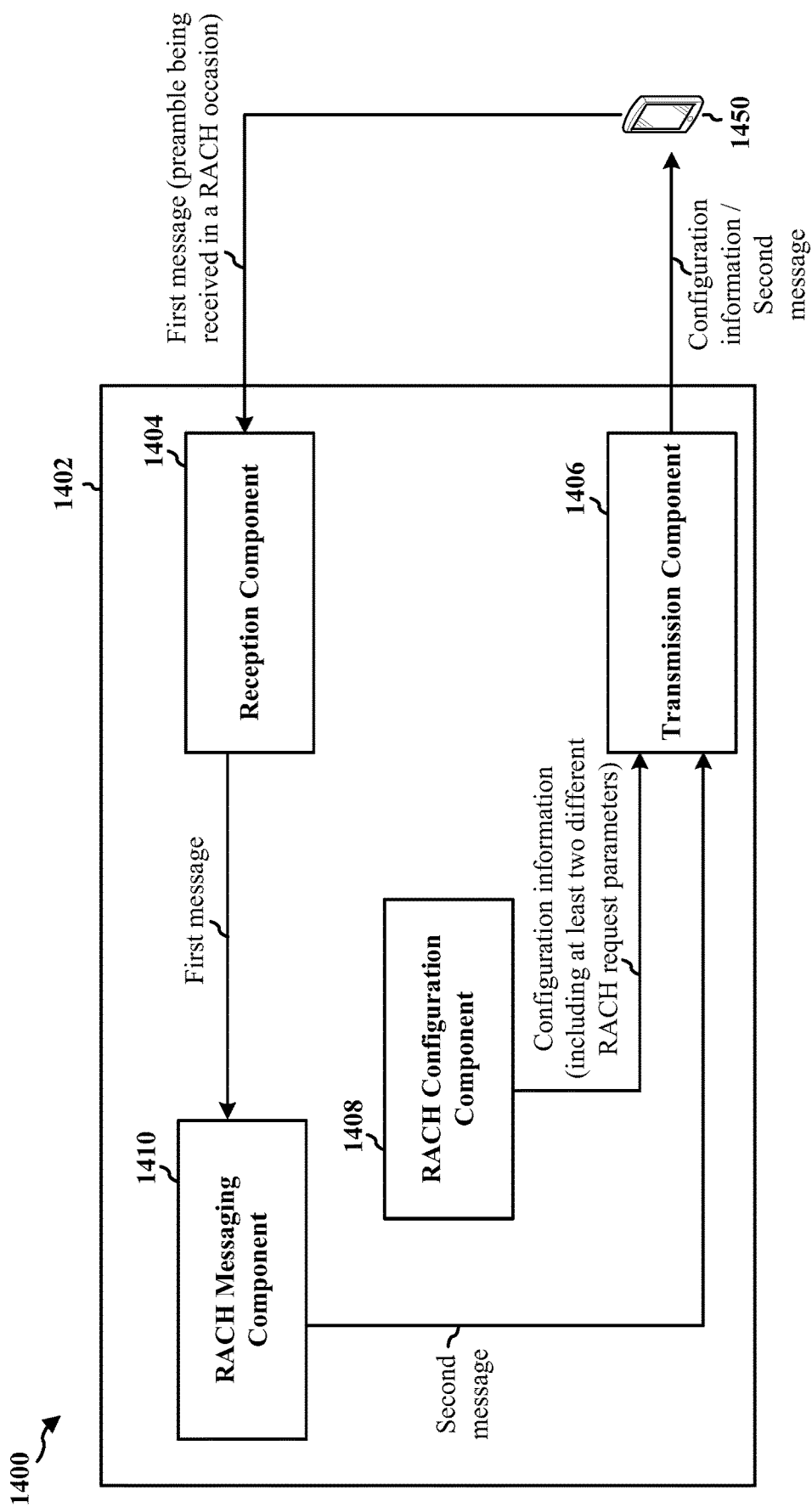
FIG. 14 is a conceptual data flow diagram illustrating the data flow between different means/components in an example apparatus.

FIG. 14 is a conceptual data flow diagram illustrating the data flow 1400 between different means/components in an example apparatus 1402. The apparatus 1402 may be a base station. The apparatus 1402 includes a RACH configuration component 1408 configured to determine configuration information associated with a RACH procedure (e.g., a two-step RACH procedure). The RACH configuration component 1408 may include at least two different power control schemes associated with transmission of a first message (e.g., a msgA) initiating the RACH procedure.

In some aspects, the RACH configuration component 1408 may include, in the configuration information, at least one configuration in the time domain, the frequency domain, and/or the spatial domain for a first set of resources associated with a RACH occasion. For example, the configuration information may indicate at least one of a configuration index (e.g., a PRACH configuration index) associated with the at least one configuration in the time domain, a number of RACH occasions available for the RACH procedure associated with the at least one configuration in the frequency domain, a starting frequency resource associated with the RACH occasions, a number of preamble sequences per SS/PBCH block, and/or a number of SS/PBCH blocks associated with each of the RACH occasions.

The apparatus 1402 may further include a transmission component 1406 configured to transmit the configuration information indicating at least two different power control schemes associated with the RACH procedure, e.g., as described in connection with operation 1102 of FIG. 11. For example, the transmission component 1406 may transmit the configuration information in at least one RRC message to the UE and/or may broadcast the configuration information in at least one SIB.

The apparatus 1402 may further include a reception component 1404 configured to receive a first message associated with the RACH procedure, e.g., as described in connection with operation 1104 of FIG. 11. For example, the first message may be a msgA initiating the (two-step) RACH procedure. According to various aspects, the preamble may occupy a different bandwidth portion of the payload, the preamble may be received via a different beam pair than the payload, and/or the preamble may be received with a different SCS than the payload.

The first message may include a time gap between the preamble and the payload. The time gap may be a configurable number of slots and/or symbols (e.g., including fractional numbers) between the preamble and the payload. For example, the time gap may be configured by the UE 1450 based on the configuration information.

The apparatus 1402 may include a RACH messaging component 1410 configured to determine at least one of a size of the payload or an MCS configured for the payload based on the preamble of the first message, e.g., as described in connection with operation 1106 of FIG. 11. In some aspects, at least one of the size of the payload and/or the MCS configured for the payload may indicate an RRC state of the UE 1450. In some other aspects, at least one of a sequence length associated with the preamble and/or the SCS configured for the first message (e.g., configured for the preamble) may be based on at least one of a type of cell operated by the apparatus 1402 and/or the RRC state of the UE 1450.

In some aspects, the RACH messaging component 1410 may be further configured to determine an ID associated with the UE 1450 based on at least one of a preamble sequence index associated with the preamble, a DMRS sequence associated with at least one reference signal in the payload, a subset of a set of bits (e.g., data bits on the uplink data channel) in the payload, a scrambling code applied to the payload, and/or a mask applied to a CRC included in the first message, e.g., as described in connection with operation 1108 of FIG. 11.

The RACH messaging component 1410 may be further configured to generate a second message associated with the RACH procedure. The second message may be a msgB that completes the (two-step) RACH procedure. The RACH messaging component 1410 may generate the second message to include control information on a downlink control channel (e.g., a PDCCH) and data on a downlink data channel (e.g., a PDSCH).

The transmission component 1406 may be further configured to transmit the second message associated with the RACH procedure to the UE 1450 in response to receiving the first message, e.g., as described in connection with operation 1110 of FIG. 11. The transmission component 1406 may transmit the control information on the downlink data channel (e.g., the PDCCH) and transmit the data on the downlink data channel (e.g., the PDSCH).

The apparatus 1402 may include additional components that perform each of the blocks of the algorithm in the aforementioned flowchart of FIG. 11. As such, each block in the aforementioned flowchart of FIG. 11 may be performed by a component and the apparatus 1402 may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 15:
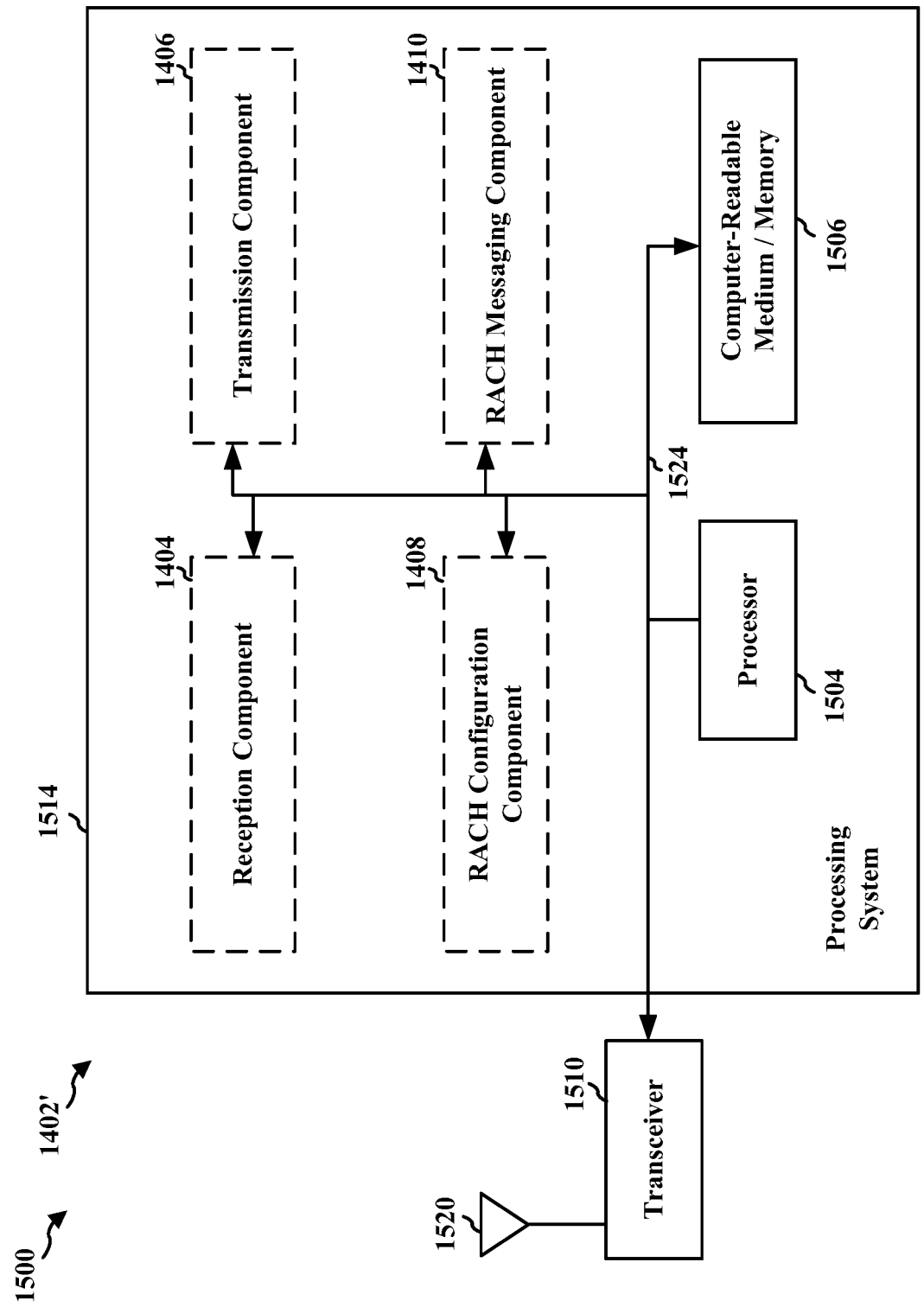
FIG. 15 is a diagram illustrating an example of a hardware implementation for an apparatus employing a processing system.

FIG. 15 is a diagram illustrating an example of a hardware implementation 1500 for an apparatus 1402' employing a processing system 1514. The processing system 1514 may be implemented with a bus architecture, represented generally by the bus 1524. The bus 1524 may include any number of interconnecting buses and bridges depending on the specific application of the processing system 1514 and the overall design constraints. The bus 1524 links together various circuits including one or more processors and/or hardware components, represented by the processor 1504, the components 1404, 1406, 1408, 1410 and the computer-readable medium/memory 1506. The bus 1524 may also link various other circuits such as timing sources, peripherals, voltage regulators, and power management circuits, which are well known in the art, and therefore, will not be described any further.

The processing system 1514 may be coupled to a transceiver 1510. The transceiver 1510 is coupled to one or more antennas 1520. The transceiver 1510 provides a means for communicating with various other apparatus over a transmission medium. The transceiver 1510 receives a signal from the one or more antennas 1520, extracts information from the received signal, and provides the extracted information to the processing system 1514, specifically the reception component 1404. In addition, the transceiver 1510 receives information from the processing system 1514, specifically the transmission component 1406, and based on the received information, generates a signal to be applied to the one or more antennas 1520. The processing system 1514 includes a processor 1504 coupled to a computer-readable medium/memory 1506. The processor 1504 is responsible for general processing, including the execution of software stored on the computer-readable medium/memory 1506. The software, when executed by the processor 1504, causes the processing system 1514 to perform the various functions described supra for any particular apparatus. The computer-readable medium/memory 1506 may also be used for storing data that is manipulated by the processor 1504 when executing software. The processing system 1514 further includes at least one of the components 1404, 1406, 1408, 1410. The components may be software components running in the processor 1504, resident/stored in the computer readable medium/memory 1506, one or more hardware components coupled to the processor 1504, or some combination thereof. The processing system 1514 may be a component of the base station 310 and may include the memory 376 and/or at least one of the TX processor 316, the RX processor 370, and the controller/processor 375. Alternatively, the processing system 1514 may be the entire base station (e.g., see 310 of FIG. 3).

In one configuration, the apparatus 1402/1402' for wireless communication includes means for transmitting configuration information indicating at least two different RACH request configuration parameters that each is associated with a respective RRC state; means for receiving a first message associated with the RACH procedure from a UE based on the configuration information, a preamble of the first message being received on a first set of resources associated with a RACH occasion and a payload of the first message being received on a second set of resources; and means for transmitting a second message associated with the RACH procedure to the UE in response to the first message, the second message including control information on a downlink control channel and data on a downlink data channel.

In one aspect, the downlink control channel includes a PDCCH and the downlink data channel includes a PDSCH. In one aspect, the configuration information indicating the RACH request configuration parameters is transmitted in a RRC message to the UE or broadcast in a SIB. In one aspect, the first message comprises a time gap between the preamble and the payload, and the time gap comprises a configurable number of slots or symbols between the preamble and the payload. In one aspect, the apparatus 1402/1402' may further includes means for determining at least one of a size of the payload or a MCS configured for the payload based on the preamble of the first message. In one aspect, the configuration information indicates at least one configuration in a time domain, a frequency domain, or a spatial domain for the first set of resources associated with the RACH occasion. In one aspect, the configuration information indicates at least one of: a configuration index associated with the configuration in the time domain, a number of RACH occasions available for the RACH procedure associated with the configuration in the frequency domain, a starting frequency resource associated with the RACH occasions, a number of preamble sequences per SS/PBCH block, or a number of SS/PBCH blocks associated with each of the RACH occasions.

In one aspect, at least one of a size of the payload or a MCS configured for the payload is based on an RRC state of the UE. In one aspect, at least one of a sequence length associated with the preamble or a subcarrier spacing associated with the receiving the first message is based on at least one of a type of a cell operated by the base station or an RRC state of the UE. In one aspect, the preamble occupies a different bandwidth portion than the payload, the preamble is transmitted with a different target power or a different power ramping step size than the payload, the preamble is received via a different beam pair than the payload, or the preamble is received with a different subcarrier spacing than the payload. In one aspect, the RACH procedure includes a two-step RACH procedure, and the first message includes a msgA initiating the two-step RACH procedure and the second message includes a msgB enabling completion of the two-step RACH procedure.

The aforementioned means may be one or more of the aforementioned components of the apparatus 1402 and/or the processing system 1514 of the apparatus 1402' configured to perform the functions recited by the aforementioned means. As described supra, the processing system 1514 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication by a user equipment (UE), the method comprising:
   receiving configuration information from a base station, the configuration information indicating at least two different random access channel (RACH) request configuration parameters, wherein each of the RACH request configuration parameters is associated with a respective radio resource control (RRC) state;
   generating a first message associated with a two-step RACH procedure including a preamble and a payload, the payload including data on an uplink data channel and at least one reference signal; and
   transmitting the first message to the base station using at least one of the at least two different RACH request configuration parameters that corresponds to an RRC state of the UE, the preamble being transmitted on a first set of resources associated with a RACH occasion and the payload being transmitted on a second set of resources.

2. The method of claim 1, wherein the uplink data channel comprises a physical uplink shared channel (PUSCH), and the at least one reference signal comprises a demodulation reference signal (DMRS).

3. The method of claim 1, wherein the configuration information is included in at least one of a system information block (SIB) or a RRC message from the base station.

4. The method of claim 1, further comprising:
   determining at least one power control scheme for transmission of the first message based on a modulation and coding scheme (MCS) and bandwidth configured for the payload, wherein the at least one power control scheme is indicated in the at least two different RACH request configuration parameters.

5. The method of claim 1, wherein the preamble and the payload are transmitted using different power control schemes indicated by the at least one of the at least two different RACH request configuration parameters.

6. The method of claim 1, wherein the first message comprises a time gap between the preamble and the payload, and the time gap comprises a configurable number of slots or symbols between the preamble and the payload.

7. The method of claim 1, wherein the preamble indicates at least one of a size of the payload or a modulation and coding scheme (MCS) configured for the payload.

8. The method of claim 1, wherein the configuration information indicates at least one configuration in a time domain, a frequency domain, or a spatial domain for the first set of resources associated with the RACH occasion.

9. The method of claim 8, where the configuration information indicates at least one of:
a physical RACH (PRACH) configuration index associated with at least one RACH occasion configuration in the time domain,
a number of RACH occasions available for the two-step RACH procedure associated with the at least one configuration in the frequency domain,
a starting frequency resource associated with the RACH occasions, a number of preamble sequences per synchronization signal (SS)/physical broadcast channel (PBCH) block, or
a number of SS/PBCH blocks associated with each of the RACH occasions.

10. The method of claim 1, wherein the RRC state of the UE is associated with at least one of a size of the payload or a modulation and coding scheme (MCS) configured for the payload.

11. The method of claim 1, wherein at least one of a sequence length associated with the preamble or a subcarrier spacing associated with the transmitting the first message is based on at least one of a type of a cell operated by the base station or the RRC state of the UE.

12. The method of claim 1, wherein:
the preamble occupies a different bandwidth portion than the payload,
the preamble is transmitted with a different target power or a different power ramping step size than the payload,
the preamble is transmitted via a different beam pair than the payload, or
the preamble is transmitted with a different subcarrier spacing than the payload.

13. The method of claim 1, further comprising:
receiving a second message associated with the two-step RACH procedure from the base station in response to the first message, wherein the second message includes control information on a downlink control channel and data on a downlink data channel.

14. The method of claim 13, wherein the first message comprises a msgA initiating the two-step RACH procedure and the second message comprises a msgB enabling completion of the two-step RACH procedure.

15. An apparatus for wireless communication by a user equipment (UE), the apparatus comprising:
a memory; and
at least one processor coupled to the memory and configured to:
receive configuration information from a base station, the configuration information indicating at least two different random access channel (RACH) request configuration parameters, wherein each of the RACH request configuration parameters is associated with a respective radio resource control (RRC) state;
generate a first message associated with a two-step RACH procedure including a preamble and a payload, the payload including data on an uplink data channel and at least one reference signal; and
transmit the first message to the base station using at least one of the at least two different RACH request configuration parameters that corresponds to an RRC state of the UE, the preamble being transmitted on a first set of resources associated with a RACH occasion and the payload being transmitted on a second set of resources.

16. The apparatus of claim 15, wherein the uplink data channel comprises a physical uplink shared channel (PUSCH), and the at least one reference signal comprises a demodulation reference signal (DMRS).

17. The apparatus of claim 15, wherein the configuration information is included in at least one of a system information block (SIB) or a radio resource control (RRC) message from the base station.

18. The apparatus of claim 15, wherein the at least one processor is further configured to:
determine at least one power control scheme for transmission of the first message based on a modulation and coding scheme (MCS) and bandwidth configured for the payload, wherein the at least one power control scheme is indicated in the at least two different RACH request configuration parameters.

19. The apparatus of claim 15, wherein the preamble and the payload are transmitted using different power control schemes indicated by the at least one of the at least two different RACH request configuration parameters.

20. The apparatus of claim 15, wherein the first message comprises a time gap between the preamble and the payload, and the time gap comprises a configurable number of slots or symbols between the preamble and the payload.

21. The apparatus of claim 15, wherein the preamble indicates at least one of a size of the payload or a modulation and coding scheme (MCS) configured for the payload.

22. The apparatus of claim 15, wherein the configuration information indicates at least one configuration in a time domain, a frequency domain, or a spatial domain for the first set of resources associated with the RACH occasion.

23. The apparatus of claim 22, where the configuration information indicates at least one of:
a physical RACH (PRACH) configuration index associated with at least one RACH occasion configuration in the time domain,
a number of RACH occasions available for the two-step RACH procedure associated with the at least one configuration in the frequency domain,
a starting frequency resource associated with the RACH occasions,
a number of preamble sequences per synchronization signal (SS)/physical broadcast channel (PBCH) block, or
a number of SS/PBCH blocks associated with each of the RACH occasions.

24. The apparatus of claim 15, wherein the RRC state of the UE is associated with at least one of a size of the payload or a modulation and coding scheme (MCS) configured for the payload.

25. The apparatus of claim 15, wherein at least one of a sequence length associated with the preamble or a subcarrier spacing associated with the transmission of the first message is based on at least one of a type of a cell operated by the base station or the RRC state of the UE.

26. An apparatus for wireless communication by a user equipment (UE), the apparatus comprising:
means for receiving configuration information from a base station, the configuration information indicating at least two different random access channel (RACH) request configuration parameters, wherein each of the RACH request configuration parameters is associated with a respective radio resource control (RRC) state;
means for generating a first message associated with a two-step RACH procedure including a preamble and a payload, the payload including data on an uplink data channel and at least one reference signal; and
means for transmitting the first message to the base station using at least one of the at least two different RACH request configuration parameters that corresponds to an RRC state of the UE, the preamble being transmitted on a first set of resources associated with a RACH occasion an
d the payload being transmitted on a second set of resources.

27. The apparatus of claim 26, wherein the uplink data channel comprises a physical uplink shared channel (PUSCH), and the at least one reference signal comprises a demodulation reference signal (DMRS).

28. The apparatus of claim 26, wherein the configuration information is included in at least one of a system information block (SIB) or a radio resource control (RRC) message from the base station.

29. The apparatus of claim 26, further comprising:
means for determining at least one power control scheme for transmission of the first message based on a modulation and coding scheme (MCS) and bandwidth configured for the payload, wherein the at least one power control scheme is indicated in the at least two different RACH request configuration parameters.

30. A non-transitory computer-readable medium storing computer executable code for wireless communication by a user equipment (UE), the code when executed by a processor cause the processor to:
receive configuration information from a base station, the configuration information indicating at least two different random access channel (RACH) request configuration parameters, wherein each of the RACH request configuration parameters is associated with a respective radio resource control (RRC) state;
generate a first message associated with a two-step RACH procedure including a preamble and a payload, the payload including data on an uplink data channel and at least one reference signal; and
transmit the first message to the base station using at least one of the at least two different RACH request configuration parameters that corresponds to an RRC state of the UE, the preamble being transmitted on a first set of resources associated with a RACH occasion and the payload being transmitted on a second set of resources.

* * * * *